US011793108B2

(12) United States Patent
Takeda et al.

(10) Patent No.: US 11,793,108 B2
(45) Date of Patent: Oct. 24, 2023

(54) AGRICULTURE SUPPORT SYSTEM, AGRICULTURE SUPPORT DEVICE AND AGRICULTURE SUPPORT METHOD

(71) Applicant: KUBOTA CORPORATION, Osaka (JP)

(72) Inventors: Shuji Takeda, Osaka (JP); Yoshiharu Yoshimoto, Osaka (JP); Masayuki Yao, Osaka (JP); Kazuhiro Takahara, Osaka (JP); Tomohiro Nishikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 451 days.

(21) Appl. No.: 16/727,368

(22) Filed: Dec. 26, 2019

(65) Prior Publication Data

US 2020/0128726 A1   Apr. 30, 2020

Related U.S. Application Data

(63) Continuation of application No. PCT/JP2018/024442, filed on Jun. 27, 2018.

(30) Foreign Application Priority Data

Jun. 28, 2017 (JP) ................... 2017-126787
Jun. 28, 2017 (JP) ................... 2017-126788

(51) Int. Cl.
*A01C 21/00* (2006.01)
*G01C 21/00* (2006.01)

(52) U.S. Cl.
CPC .......... *A01C 21/007* (2013.01); *G01C 21/005* (2013.01)

(58) Field of Classification Search
CPC .. A01C 21/007; G01C 21/005; A01M 9/0092; Y02A 40/22; A01B 79/005; G06Q 50/02
See application file for complete search history.

(56) References Cited

U.S. PATENT DOCUMENTS

| 8,412,419 B1 | 4/2013 | Seamon et al. |
| 2002/0022929 A1* | 2/2002 | Ell .............. A01B 79/005 |
| | | 702/5 |

(Continued)

FOREIGN PATENT DOCUMENTS

| JP | 2011-254711 | 12/2011 |
| JP | 2011254711 A * | 12/2011 |

(Continued)

OTHER PUBLICATIONS

Extended European Search Report issued in the corresponding European Patent Application No. 18825127.6 dated Feb. 5, 2021.

(Continued)

*Primary Examiner* — Nga X Nguyen
(74) *Attorney, Agent, or Firm* — Greenblum & Bernstein, P.L.C.

(57) ABSTRACT

An agriculture support system includes a data obtaining device to obtain at least one type of data among a plurality of types of data relating to planting of crops, a mesh setting device to allocate, as divided data, the data obtained by the data obtaining device to each of areas of an agricultural field in which the crops are planted, a first map display to relate, to a location of the agricultural field, the divided data allocated to each of the areas by the mesh setting device and to display the divided data as a first field map, a spreading setting device to set a spreading amount of spread substance in each of the areas based on the divided data of each of the areas, and a second map display to relate, to the location of the agricultural field, the spreading amount and to display the spreading amount.

10 Claims, 19 Drawing Sheets

(56) References Cited

U.S. PATENT DOCUMENTS

| | | | |
|---|---|---|---|
| 2006/0282467 A1* | 12/2006 | Peterson | G06Q 50/02 |
| 2012/0101934 A1* | 4/2012 | Lindores | G06Q 10/06312 |
| | | | 705/37 |
| 2016/0180473 A1 | 6/2016 | Groeneveld | |
| 2017/0032472 A1* | 2/2017 | Honda | G06Q 50/02 |
| 2018/0020622 A1* | 1/2018 | Richt | G06Q 50/02 |
| | | | 703/6 |

FOREIGN PATENT DOCUMENTS

| | | |
|---|---|---|
| JP | 2013-234935 | 11/2013 |
| JP | 2014-194653 | 10/2014 |
| JP | 2015-049868 | 3/2015 |
| JP | 2015049868 A * | 3/2015 |
| JP | 2015-99435 A | 5/2015 |

OTHER PUBLICATIONS

International Search Report issued in International Patent Application No. PCT/JP2018/024442, dated Oct. 9, 2018.

* cited by examiner

FIG.2

| Group | Divided data D1n |
|---|---|
| 1st group G1 | less than 500 |
| 2nd group G2 | 500 or more and less than 600 |
| 3rd group G3 | 600 or more and less than 700 |
| 4th group G4 | 700 or more and less than 800 |
| 5th group G5 | more than 800 |

| Group | Divided data D2n |
|---|---|
| 1st group G1 | less than 500 |
| 2nd group G2 | 500 or more and less than 600 |
| 3rd group G3 | 600 or more and less than 700 |
| 4th group G4 | 700 or more and less than 800 |
| 5th group G5 | more than 800 |

Field selection

Operation period 2016/04/01 ~ 2017/10/31
Field name (Partial match) [          ]  🔍 Display list    [Select]

| Field name | Operation start | Operation end |
|---|---|---|
| ○ FieldA | 2016/04/01 6:30 | 2016/04/01 8:43 |
| ○ FieldB | 2016/04/02 6:40 | 2016/04/02 8:42 |
| ○ FieldC | 2016/04/04 6:32 | 2016/04/04 8:38 |
| ○ FieldB | 2016/04/04 12:20 | 2016/04/04 14:35 |
| ◉ FieldA | 2016/04/05 6:35 | 2016/04/05 8:44 |
| ○ FieldD | 2016/04/08 6:30 | 2016/04/08 8:43 |
| ○ FieldE | 2016/04/08 12:17 | 2016/04/08 15:02 |
| ○ FieldA | 2016/04/09 6:35 | 2016/04/09 8:41 |
| ○ FieldC | 2016/04/10 6:34 | 2016/04/10 8:44 |
| ○ FieldB | 2016/04/11 6:41 | 2016/04/11 8:43 |
| ○ FieldF | 2016/04/12 5:58 | 2016/04/12 8:43 |
| ○ FieldC | 2016/04/13 6:15 | 2016/04/13 8:45 |
| ○ FieldB | 2016/04/16 6:28 | 2016/04/16 8:38 |
| ○ FieldE | 2016/04/16 12:21 | 2016/04/16 14:59 |
| ○ FieldG | 2016/04/17 5:54 | 2016/04/17 8:44 |
| ○ FieldE | 2016/04/18 5:58 | 2016/04/18 8:43 |
| ○ FieldA | 2016/04/18 12:14 | 2016/04/18 15:32 |
| ○ FieldB | 2016/04/19 12:22 | 2016/04/19 15:24 |
| ○ FieldF | 2016/04/20 5:56 | 2016/04/20 8:42 |
| ○ FieldH | 2016/04/21 6:10 | 2016/04/21 8:46 |

Map selection

Operation period  2017/05/01  ~  2017/06/01   🔍Search      Select

| Operation start | Operation end | Vegitation value | Average | Ycordinate | Xcordinate |
|---|---|---|---|---|---|
| 2017/05/19 14:15 | 2017/05/19 17:35 | Vegitation1 | *** | ○ | ○ |
| 2017/05/19 14:15 | 2017/05/19 17:35 | Vegitation2 | *** | ○ | ○ |
| 2017/05/19 14:15 | 2017/05/19 17:35 | Vegitation3 | *** | ○ | ○ |
| 2017/05/19 14:15 | 2017/05/19 17:35 | Vegitation4 | *** | ○ | ○ |
| 2017/05/19 14:15 | 2017/05/19 17:35 | Taste | *** | ○ | ○ |
| 2017/05/19 14:15 | 2017/05/19 17:35 | Yield | *** | ○ | ○ |
| 2017/05/21 12:30 | 2017/05/21 16:00 | Vegitation2 | *** | ○ | ○ |
| 2017/05/21 12:30 | 2017/05/21 16:00 | Vegitation1 | *** | ○ | ○ |
| 2017/05/21 12:30 | 2017/05/21 16:00 | Vegitatino2 | *** | ○ | ○ |
| 2017/05/21 12:30 | 2017/05/21 16:00 | Vegitation4 | *** | ○ | ○ |
| 2017/05/21 12:30 | 2017/05/21 16:00 | Vegitation3 | *** | ○ | ◉ |
| 2017/05/21 12:30 | 2017/05/21 16:00 | Taste | *** | ◉ | ○ |
| 2017/05/21 12:30 | 2017/05/21 16:00 | Yield | *** | ○ | ○ |
| 2017/05/22 13:10 | 2017/05/22 16:40 | Vegitation2 | *** | ○ | ○ |
| 2017/05/22 13:10 | 2017/05/22 16:40 | Vegitation4 | *** | ○ | ○ |
| 2017/05/22 13:10 | 2017/05/22 16:40 | Vegitation1 | *** | ○ | ○ |
| 2017/05/22 13:10 | 2017/05/22 16:40 | Vegitation3 | *** | ○ | ○ |
| 2017/05/22 13:10 | 2017/05/22 16:40 | ... | *** | ○ | ○ |
| 2017/05/22 13:10 | 2017/05/22 16:40 | ... | *** | ○ | ○ |

Registration screen  T11

Name  ********  330
Manufacturer  ********  331
Usage  Base fertilization  332
Contents  N  20  %  P  9  %  K  12  %  333
Weight  334
Per 10a  335
(STD spraying amount)

Register

AGRICULTURE SUPPORT SYSTEM, AGRICULTURE SUPPORT DEVICE AND AGRICULTURE SUPPORT METHOD

CROSS-REFERENCE TO RELATED APPLICATIONS

The present application is a continuation application of International Application No. PCT/JP2018/024442, filed Jun. 27, 2018, which claims priority to Japanese Patent Application No. 2017/126787, filed Jun. 28, 2017, and to Japanese Patent Application No. 2017/126788, filed Jun. 28, 2017. The contents of these applications are incorporated herein by reference in their entirety.

BACKGROUND OF THE INVENTION

Field of the Invention

The present invention relates to an agriculture support system, to an agriculture support system, and to an agriculture support method.

Description of Related Art

A technique for setting a fertilizing amount to an agricultural field disclosed Japanese Unexamined Patent Application Publication No. 2013-234935 is previously known.

The fertilization amount setting method disclosed in Japanese Unexamined Patent Application Publication No. 2013-234935 includes a yield difference calculation step for calculating a yield difference that is a difference between a target yield of the grain and an actual result value of the yield of the grain, and a taste difference calculation step for calculating a taste difference that is a difference between a target taste value of the grain and an actual result value of the taste value. The method sets the fertilization amount by inputting, to a mobile terminal or the like, a weighting value for the yield difference calculated at the yield difference calculation step and for the taste difference calculated at the taste difference calculation step.

SUMMARY OF THE INVENTION

An agriculture support system includes: a data obtaining device to obtain at least one type of data among a plurality of types of data relating to planting of crops; a mesh setting device to allocate, as divided data, the data obtained by the data obtaining device to each of areas of an agricultural field in which the crops are planted; a first map display to relate, to a location of the agricultural field, the divided data allocated to each of the areas by the mesh setting device and to display the divided data as a first field map; a spreading setting device to set a spreading amount of spread substance in each of the areas based on the divided data of each of the areas; and a second map display to relate, to the location of the agricultural field, the spreading amount set to each of the areas by the spreading setting device and to display the spreading amount as a second field map.

An agriculture support device includes: a data obtaining device to obtain at least one type of data among a plurality of types of data relating to planting of crops; a mesh setting device to allocate, as divided data, the data obtained by the data obtaining device to each of areas of an agricultural field in which the crops are planted; a first map display to relate, to a location of the agricultural field, the divided data allocated to each of the areas by the mesh setting device and to display the divided data as a first field map; a spreading setting device to set a spreading amount of spread substance in each of the areas based on the divided data of each of the areas; and a second map display to relate, to the location of the agricultural field, the spreading amount set to each of the areas by the spreading setting device and to display the spreading amount as a second field map.

An agriculture support method includes: obtaining at least one type of data among a plurality of types of data relating to planting of crops; allocating, as divided data, the obtained data to each of areas of an agricultural field in which the crops are planted; relating, to a location of the agricultural field, the divided data allocated to each of the areas and displaying the divided data as a first field map; setting a spreading amount of spread substance in each of the areas based on the divided data of each of the areas; and relating, to the location of the agricultural field, the spreading amount set to each of the areas and displaying the spreading amount as a second field map.

An agriculture support system includes: a data obtaining device to obtain at least two types of data among a plurality of types of data relating to planting of crops; a mesh setting device to allocate, as divided data, the at least two types of data obtained by the data obtaining device to each of areas of an agricultural field in which the crops are planted; and a spreading setting device to set a spreading amount of spread substance in each of the areas based on at least two types of the divided data allocated to each of the areas by the mesh setting device.

An agriculture support device includes: a data obtaining device to obtain at least two types of data among a plurality of types of data relating to planting of crops; a mesh setting device to allocate, as divided data, the at least two types of data obtained by the data obtaining device to each of areas of an agricultural field in which the crops are planted; and a spreading setting device to set a spreading amount of spread substance in each of the areas based on at least two types of the divided data allocated to each of the areas by the mesh setting device.

An agriculture support method includes: obtaining at least two types of data among a plurality of types of data relating to planting of crops; allocating, as divided data, the at least two types of the obtained data to each of areas of an agricultural field in which the crops are planted; and setting a spreading amount of spread substance in each of the areas based on at least two types of the divided data allocated to each of the areas.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a view illustrating a setting screen T1 according to the first embodiment;

FIG. 3 is a view illustrating a relation between divided data D1n and D2n and groups according to the first embodiment;

FIG. 4 is a view illustrating a list T2 according to the first embodiment;

FIG. 5 is a view illustrating a group setting screen T3 according to the first embodiment;

FIG. 6 is a view illustrating a state where a change screen T4 is displayed on the setting screen T1 according to the first embodiment;

FIG. 7 is a view illustrating a setting screen T5 according to the first embodiment;

FIG. 8 is a view illustrating a list T6 according to the first embodiment;

FIG. 10A is a view illustrating the setting screen T1 including a field portion input portion according to the first embodiment;

FIG. 10B is a view illustrating the setting screen T1 including an area portion input portion according to the first embodiment;

FIG. 14 is a view illustrating a spread substance registering screen T11 according to the second embodiment;

DESCRIPTION OF THE EMBODIMENTS

Hereinafter, an embodiment of the present invention will be described with reference to the drawings as appropriate.

First Embodiment

Figure 1:
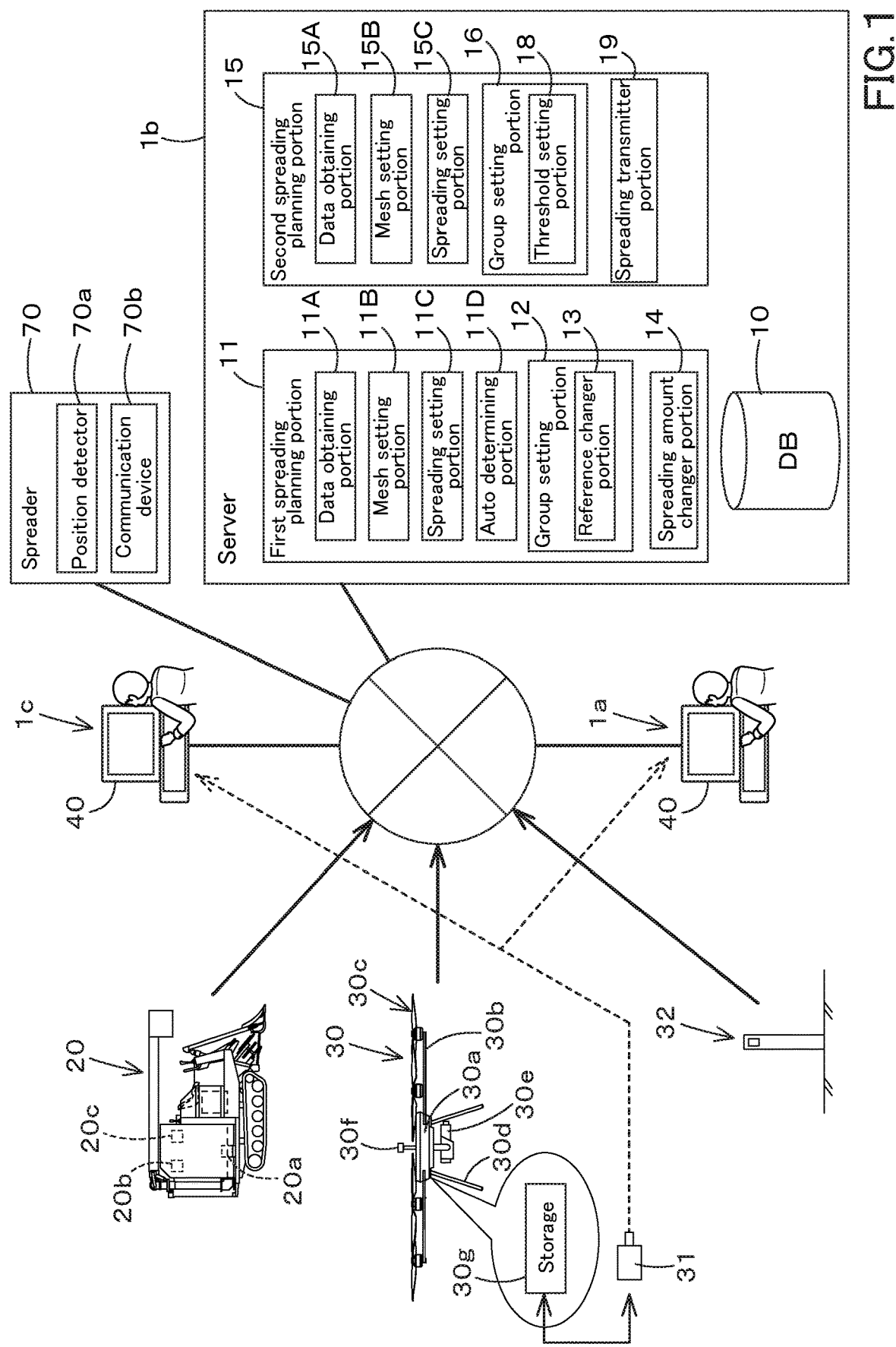
FIG. 1 is a view illustrating an agriculture support system according to a first embodiment of the present invention.

FIG. 1 shows an agriculture support system. The agriculture support system is a system that provides support relating to the spreading of the spread substance, for example. The spread substance (the spread agent) is, for example, chemical agents (agrochemicals), fertilizers, or the like. The agriculture support system includes a computer.

The computer includes, for example, a management computer 1a installed in a farmer's house, a farming company, or the like, and includes a server 1b to which the management computer 1a can be connected. The management computer 1a is, for example, a personal computer (PC) assigned to an administrator or an operator. The management computer 1a may be a mobile terminal such as a smartphone, a tablet, or a PDA.

As shown in FIG. 1, the server 1b is an agriculture support device that supports the agriculture operation, and is configured to obtain various types of data (information) related to the agriculture. The server 1b obtains data related to the cropping, for example, the data such as the crops data and the soil data. The crops data and the soil data are data obtained through the remote sensing method, for example.

The crops data is data related to the crops planted in the agricultural field, for example, the data indicating the yield of the crops in the agricultural field (the yield data), the data indicating the chemical composition of the crops (the crops components data), and the data indicating the growth status of the crops (the growth data). The crops components data is, for example, the water content rate of the crops (the moisture content), the taste of the crops (the protein content), and the like. The soil data is data related to the soil in the agricultural field, for example, the data indicating the chemical compositions of the soil (the soil components data).

The yield data and the crops components data are detected by, for example, the harvester (harvesting machine) 20 in harvesting the crops. The harvesting machine 20 is a combine configured to harvest the crops. The harvesting machine 20 includes a measurement device 20a, a communication device 20b, and a position detector device 20c. The measurement device 20a includes a load cell configured to detect the weight (the yield) of the harvested crops, and includes a spectroscopic analysis device configured to measure the moisture content and the protein content of the harvested crops. The position detector device 20c is a device configured to detect the position of the harvesting machine 20, that is, the position detector device 20 detects a position (the latitude, the longitude) based on data from the positioning satellites such as the GPS. The harvesting machine 20 obtains the yield data by associating the position detected by the position detector device 20c with the weight (the yield) of the crops detected by the measuring device 20a when the crops is harvested. In addition, the harvesting machine 20 obtains the crops components data by associating the position detected by the position detector device 20c with the moisture content (the water content rate) and the protein content (the protein content rate) of the crops detected by the measuring device 20a when the crops is harvested.

The communication device 20b is a device configured to transmit detected information that is detected at least by the harvesting machine 20, that is, to transmit the yield data and the crops components data (the moisture content rate, the protein content rate) to the outside. The communication device 20b transmits the yield data and the crops components data (the moisture content rate, the protein content rate) to the server 1b. Upon receiving the yield data and the crops components data (the moisture content rate, the protein content rate), the server 1b stores, in the storage portion (the database) 10, the yield data received and the crops components data (the moisture content rate, the protein content rate) received.

In addition, the original data of the growth data is detected by an unmanned flying object 30 such as a multicopter. The multicopter 30 includes a main body 30a, an arm 30b provided on the main body 30a, a rotary blade 30c provided on the arm 30b, and a skid 30d provided on the main body 30a. The rotary blade 30c is a device that generates a lifting force for the flying, and includes a rotor that provides a rotational force, and includes a blade (a propeller) that is rotated by the rotational force of the rotor.

In addition, the multicopter 30 includes an imaging device 30e. The imaging device 30e is a device constituted of an infrared camera or the like, and is capable of imaging crops in an agricultural field. The multicopter 30 has the position detector device 30f. The position detector device 30f is a device configured to detect the position of the multicopter 30, and detects a position (the latitude and the longitude) based on data from the positioning satellite such as the GPS. The multicopter 30 flies over the agricultural field and takes aerial images of the crops on the agricultural field, and then obtains the captured image data by associating the image (the captured image) captured by the imaging device 30e with the position detected by the position detecting device 30f.

The image data is stored in the storage portion 30g provided in the multicopter 30. The image data stored in the storage portion 30g of the multicopter 30 is transferred to an electronic storage medium 31 such as a USB memory or an SD card, and then is stored in the electronic storage medium 31. The image data stored in the electronic storage medium 31 is transferred to the management computer 1a or a fixed management computer 1c installed in an aerial photography service company or the like separately from the management computer 1a. The imaging data transferred is stored in the management computer 1a or the management computer 1c. In addition, after the management computer 1a or the management computer 1c logs in to the server 1b, the image data stored in the management computer 1a or the management computer 1c is transmitted to the server 1b. When receiving the image data, the server 1b stores the received imaging data in the storage portion (the database) 10. The server 1b analyzes the captured data (the captured image) to generate the growth data based on the vegetation indexes such as the DVI, the RVI, the NDVI, the GNDVI, the SAVI, the TSAVI, the CAI, the MTCI, the REP, the PRI, and the RSI. The growth data generated by the server 1b is stored in the storage portion 10. The vegetation indexes mentioned above is just an example and is not limited thereto.

The growth data may be generated from the image data by the management computer 1a or the management computer 1c, and the generated growth data may be transmitted from the management computer 1a or the management computer 1c to the server 1b. In addition, in the embodiment described above, the crops in the agricultural field are imaged by the multicopter 30, but as shown in FIG. 1, the crops in the agricultural field may be imaged by the agricultural field monitoring device 32 installed in the agricultural field, and the image data may be obtained by adding, to the captured image the position of the agricultural field related to the agricultural field monitoring device 32.

Similar to the growth data described above, the soil data can be obtained by capturing an image of the agricultural field with an imaging device such as a camera and further by analyzing the captured image. That is, the "growth data" described above may be replaced with the "soil data".

As described above, the server 1b is configured to obtain, as the crops data, the yield data, the crops components data (the moisture content rate, the protein content rate), and the growth data, and configured to store, as a database, the data in the storage portion 10. In addition, the server 1b is configured to obtain the soil data, and configured to save, as a database, the data in the storage portion 10.

Hereinafter, the description will be made assuming that the crops data [the yield data, the crops components data (the moisture content rate, the protein content rate), the growth data] and the soil data include the position information such as a position (the latitude, the longitude).

The server 1b is configured to create a spreading plan for the spreading on the agricultural field with reference to the above-mentioned crops data, the above-mentioned soil data, and the like. The spreading plan is a plan for setting how much the spread substance (fertilizer, chemicals, or the like) is spread on which part of the agricultural field at least in a predetermined agricultural field.

The server 1b includes a first spreading planning portion 11. The first spreading planning portion 11 is constituted of the electric/electronic components provided in the server 1b, the electric circuit, the computer program stored in the server 1b, or the like.

The first spreading planning portion 11 creates a spreading plan for spreading on the agricultural field with use of at least one piece of data (one type of data) among the crops data (the yield data, the crops components data, the growth data, and the soil data).

For example, when the management computer 1a logs in to the server 1b, a menu screen for selecting a menu or the like is displayed on the display portion 40 of the management computer 1a. The display portion 40 is constituted of a liquid crystal monitor or the like.

Figure 2:
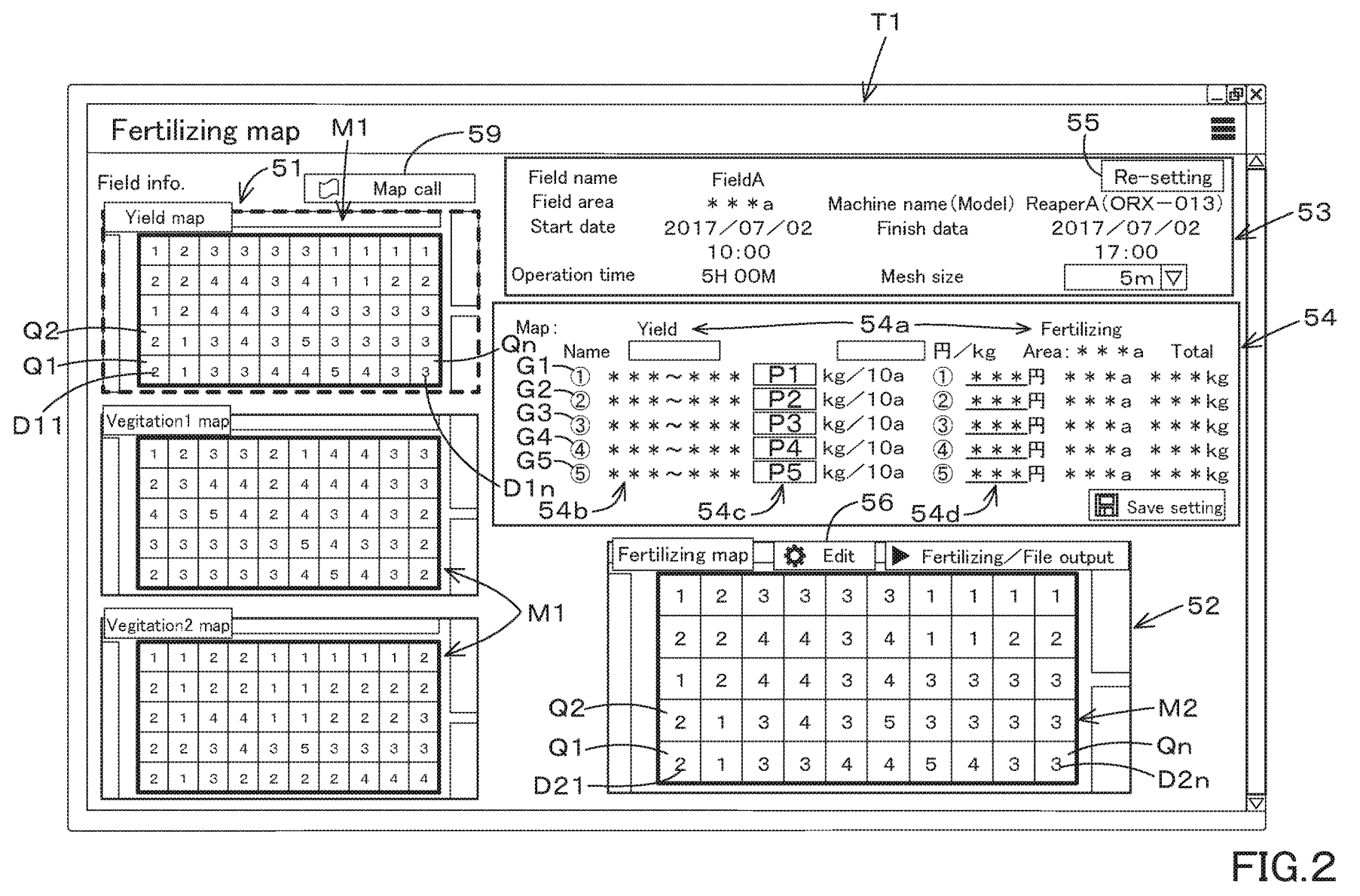

When an icon, a button, or the like of the spreading plan is selected on the menu screen and a predetermined operation is performed, the management computer 1a requests the server 1b to create the spreading plan. The first spreading planning portion 11 of the server 1b displays, on the management computer 1a, a setting screen T1 for making a spreading plan as shown in FIG. 2.

The setting screen T1 includes a first map display portion 51, a second map display portion 52, a basic display portion 53, and a spread designing portion 54.

The first map display portion 51 displays a map obtained from data to be referred to in creating the spreading plan. For example, the first map display portion 51 respectively displays a first agricultural field map [the yield map, the crops components map (the moisture map, the taste map, and the like), the growth map, and the soil map] M1 on the basis of each of the yield data, the crops components data (the moisture content rate, the protein content rate), the growth data, and the soil data.

When a plurality of the first agricultural field maps M1 are displayed on the first map display portion 51, an arbitrary one of the plurality of first agricultural field maps M1 can be selected on the first map display portion 51. For convenience of the explanation, the first agricultural field map M1 selected on the first map display portion 51 is referred to as a "selected agricultural field map".

The first agricultural field map M1 is a mesh map in which one agricultural field is divided into a plurality of areas Qn (n=1, 2, 3, ... N). In addition, the first agricultural field map M1 a map to which a plurality of groups (a plurality of ranks) are assigned according to the size (a value) of the divided data D1n with respect to the divided data D1n (n=1, 2, 3, ..., N) corresponding to each of the plurality of areas Qn. That is, in the first agricultural field map M1, the groups (the ranks) are indicated by colors, numerical values, characters, or the like so that a group (a rank) assigned in advance can be identified for each of the plurality of areas Qn. In the case of the example of FIG. 2, the numerical values shown in the plurality of areas Qn of the first agricultural field map M1 indicate the groups.

For example, as shown in FIG. 3, the divided data D1n is divided into groups of five levels according to the numerical values. The group with the smallest numerical value is a "first group G1", and the group with the largest numerical value is a "fifth group G5". Between the "first group G1" and the "fifth group G5", the "second group G2," the "third group G3," and the "fourth group G4" are assigned in the order from the group with the smaller numerical value. Note that how many groups the divided data D1n is divided into is arbitrary, and is not limited to the above-described example. The numerical values shown in FIG. 3 are numerical values for explaining the grouping, and are not limited thereto.

The second map display portion 52 displays a second agricultural field map (a spreading amount map) M2 including the spreading amount set based on the first agricultural field map M1 displayed on the first map display portion 51. Similar to the first map display portion 51, the second agricultural field map M2 is a mesh-type map in which one agricultural field is divided into a plurality of areas Qn, and the length of the mesh width (an area width) and the number of meshes (the number of areas) is set in the same manner as the first agricultural field map M1 corresponding to the first agricultural field map M1. The second agricultural field map M2 is a map to which a plurality of groups are assigned in accordance with the size (the value) of the divided data D2n corresponding to the plurality of areas Qn. That is, in the second agricultural field map M2, the groups (the ranks) are indicated by colors, numerical values, characters, or the like so that the groups (ranks) assigned in advance can be identified for each of the plurality of areas Qn. In the case of the example of FIG. 2, the numerical values shown in the plurality of areas Qn of the first agricultural field map M1 indicate the groups.

For example, as shown in FIG. 3, the divided data D2n is divided into groups of five levels according to the numerical value. The group with the smallest numerical value is the "first group G1", and the group with the largest numerical value is the "fifth group G5. Between the "first group G1" and the "fifth group G5", the "second group G2," the "third group G3," and the "fourth group G4" are assigned in the order from the group with the smaller numerical value. That is, the number of grooves assigned corresponding to the divided data D2n is equal to the number of groups assigned corresponding to the divided data D1n. The number of groups into which the divided data D2n is divided is arbitrary, and is not limited to the above-described example. The numerical values shown in FIG. 3 are numerical values for explaining the grouping, and are not limited thereto.

The basic display portion 53 displays the information (the agricultural field information) relating to the agricultural field to which the fertilization plan is set. The basic display portion 53 displays the agricultural field name and the agricultural field area registered in advance in the management computer 1a or the server 1b. In addition, the basic display portion 53 may display the basic information of the selected farm map M1 in the first agricultural field map M1 displayed on the first map display 51. For example, when the selected agricultural field map M1 is the yield map, the date and time when the crops was harvested, the name of the harvester that harvested the crops, the model number, and the like are displayed as the basic information.

The spread designing portion 54 is a portion configured to input information necessary for setting the spreading amount, and has a name display portion 54a, a group display portion 54b, a spreading inputting portion (an input portion) 54c, and a cost display portion 54d.

The name display portion 54a displays the name of the first agricultural field map (the selected agricultural field map) M1 selected by the first map display portion 51, and displays the name of the second agricultural field map M2. The group display portion 54b displays a plurality of groups set in the first agricultural field map (the selected agricultural field map) M1. In addition, the group display portion 54b displays a range of the divided data D1n corresponding to each of the groups, that is, a reference value used for dividing the divided data D1n into the groups.

The spread input portion 54c is a portion configured to input a set spreading amount set for each of the groups. The spread input portion 54c includes a first input portion configured to input a set spreading amount P1 corresponding to the first group G1, a second input portion configured to input a set spreading amount P2 corresponding to the second group G2, a third inputting portion configured to input a set spreading amount P3 corresponding to the third group G3, a fourth input portion configured to input a set spreading amount P4 corresponding to the fourth group G4, and a fifth input portion configured to input a set spreading amount P5 corresponding to the fifth group G5. Note that the value (the set spreading amount) inputted to the spreading input portion 54c may be a spreading amount per unit area, or any other arbitrarily determined value.

The cost display portion 54d displays the purchasing cost of the spread substance for each of the groups on the basis of the set spreading amount inputted to the spread input portion 54. For example, the purchasing cost of the spread substance for each of the groups is calculated and displayed based on the purchasing cost per 1 kg of the spread substance.

Thus, an administrator, an operator, or the like can set the spreading amount on the agricultural field for each predetermined area with use of the setting screen T1 displayed on the display portion 40 of the management computer 1a.

Next, the operation of the server 1a (the first spreading planning portion 11) in the operation of the setting screen T1 and the creation method of the spreading plan (setting of the spreading amount) will be described in detail.

As shown in FIG. 1, the first spreading planning portion 11 includes a data obtaining portion 11A, a mesh setting portion 11B, a spreading setting portion 11C, and a group setting portion 12. The data obtaining portion 11A, the mesh setting portion 11B, the spreading setting portion 11C, and the group setting portion 12 are constituted of an electric/electronic component provided in the server 1b, an electric circuit, a computer program and the like stored in the server 1b.

The data obtaining portion 11A executes the processing to obtain at least one type of data from among the plurality of data (the yield data, the crops components data, the growth data, the soil data) (an obtaining step). For example, when the map call button 59 is selected on the setting screen T1 by an input interface such as a mouse or a keyboard, the data obtaining portion 11A is activated to start the obtaining step. And, the data obtaining portion 11A displays a list T2 of the data (the yield data, the crops components data, the growth data, the soil data) on the management computer 1a as shown in FIG. 4, with reference to the database (the storage portion) 10 of the server 1b. When one type of data is selected from the list T2, the data obtaining portion 11A calls, from the storage portion 10, the data selected from the list T2 to obtain the data corresponding to one agricultural field from the storage portion 10 (hereinafter may be referred to as an agricultural field data), and then the obtaining step ends.

The mesh setting portion 11B performs a processing of assigning any one (the agricultural field data) of the crops data and the soil data included in the data obtained by the data obtaining portion 11A to each area Qn in the agricultural field (mesh setting step). For example, when the mesh size is 5 m, the mesh setting portion 11B sets the width (a vertical width, a horizontal width) of one side of the area Qn to 5 m, divides the agricultural field into a plurality of areas Qn by every 5 m, and sets the agricultural field data as the data that is allocated to the area Qn formed by being divided in the mesh size. Here, when there are a plurality of data entering the area Qn, the mesh setting portion 11B averages the data values, and assigns the average value as the divided data D1n corresponding to the area Qn, for example. In addition, when the number of data entering the area Qn is one, the mesh setting portion 11B allocates the data as the divided data D1n corresponding to the area Qn.

The mesh size can be set by inputting a numerical value of the "mesh size" represented in the basic display portion 53. In addition, the method of assigning the agricultural field data to the divided data D1n corresponding to the area Qn is not limited to the above-described example.

The group setting portion 12 sets a group for the divided data D1n for each area Qn allocated by the mesh setting portion 11B. As shown in FIG. 3, when the management computer 1a or the server 1b store in advance the group setting information representing the relation between the number of groups and the reference values (the upper limit value, the lower limit value) for each group, the group setting portion 12 refers to the group setting information, compares the divided data D1n with the reference value for each group, and assigns a group to each divided data D1n to set a group.

The first map display portion 51 displays the divided data D1n for each area Qn assigned by the mesh setting portion 11B as the first agricultural field map M1 (a first displaying step). The first map display portion 51 displays, on the setting screen T1, the information (the numbers, the characters, the colors, and the like) indicating a group for each divided data D1n set by the group setting portion 12.

In this embodiment, regarding the displaying of the divided data D1n, the divided data D1n is divided into a plurality of groups based on the reference value, and the information representing the group is displayed on the setting screen T1, so that the divided data D1n is displayed for each area Qn. However, the raw value of the divided data D1n may be displayed on the setting screen T1.

In addition, the first map display portion 51 finds an agricultural field name, which field the first agricultural field map M1 represents, based on the position (the latitude, the longitude) included in the agricultural field data that is the origin of the divided data D1n, and displays the found name on the basic display portion 53. In this manner, the first agricultural field map M1 displayed by the first map display portion 51 can be known by watching the basic display portion 53.

When the file name of the agricultural field data is associated with the agricultural field name, the first map display portion 51 may identify the agricultural field name from the file name of the agricultural field data, and may display the identified agricultural field name in the basic display portion 53.

The spreading setting portion 11C sets the spreading amount of the spread substance for each area Q1n based on the divided data D1n for each area Qn (a spreading setting step). For example, the spreading setting portion 11C sets the spreading amount for each area Qn in accordance with the set spreading amount determined for each group. When the set spreading amount for each group inputted to the spreading input portion 54c is represented by "Pi ("I" indicates group number)", the spreading setting portion 11C sets the set spreading amount Pi as the spreading amount Ri for each area Qn.

In particular, when there are five groups, the spreading setting portion 11C sets the set spreading amount P1 for the first group G1 as the spreading amount R1 for each area Qn, sets the set spreading amount P2 for the second group G2 as the spreading amount R2 for each area Qn, sets the set spreading amount P3 for the third group G3 as the spreading amount R3 for each area Qn, sets the set spreading amount P4 for the fourth group G4 as the spreading amount R4 for each area Qn, and sets the set spreading amount P5 for the fifth group G5 as the spreading amount R5 for each area Qn.

That is, the spreading setting portion 11C associates the spreading amount Pi for each area Qn with the divided data D2n corresponding to the area Qn of the second agricultural field map M2 (the spreading amount Pi for each area Qn is equal to the divided data D2n).

The second map display portion 52 displays the spreading amount Pi for each area Qn set by the spreading setting portion 11C as a second agricultural field map M2 in association with the position of the agricultural field. That is, the divided data D2n corresponding to the area Qn set by the spreading setting portion 11C is divided into groups preliminarily determined, and then the information (the numbers, the characters, the colors, and the like) indicating the group of the divided data D2n is displayed for each area Qn on the setting screen T1.

In this embodiment, regarding the displaying of the divided data D2n, the divided data D2n is divided into a plurality of groups, and the information indicating the group is displayed on the setting screen T1. In this manner, the divided data D2n is displayed for each area Qn. However, the raw value of the divided data D2n (the spreading amount Pi for each area Qn) may be displayed on the setting screen T1.

The above-described embodiment describes that the reference values (the upper limit value, the lower limit value) for each group are preliminarily stored in the management computer 1a creating the spreading plan, but the reference values may be freely changed.

Figure 5:
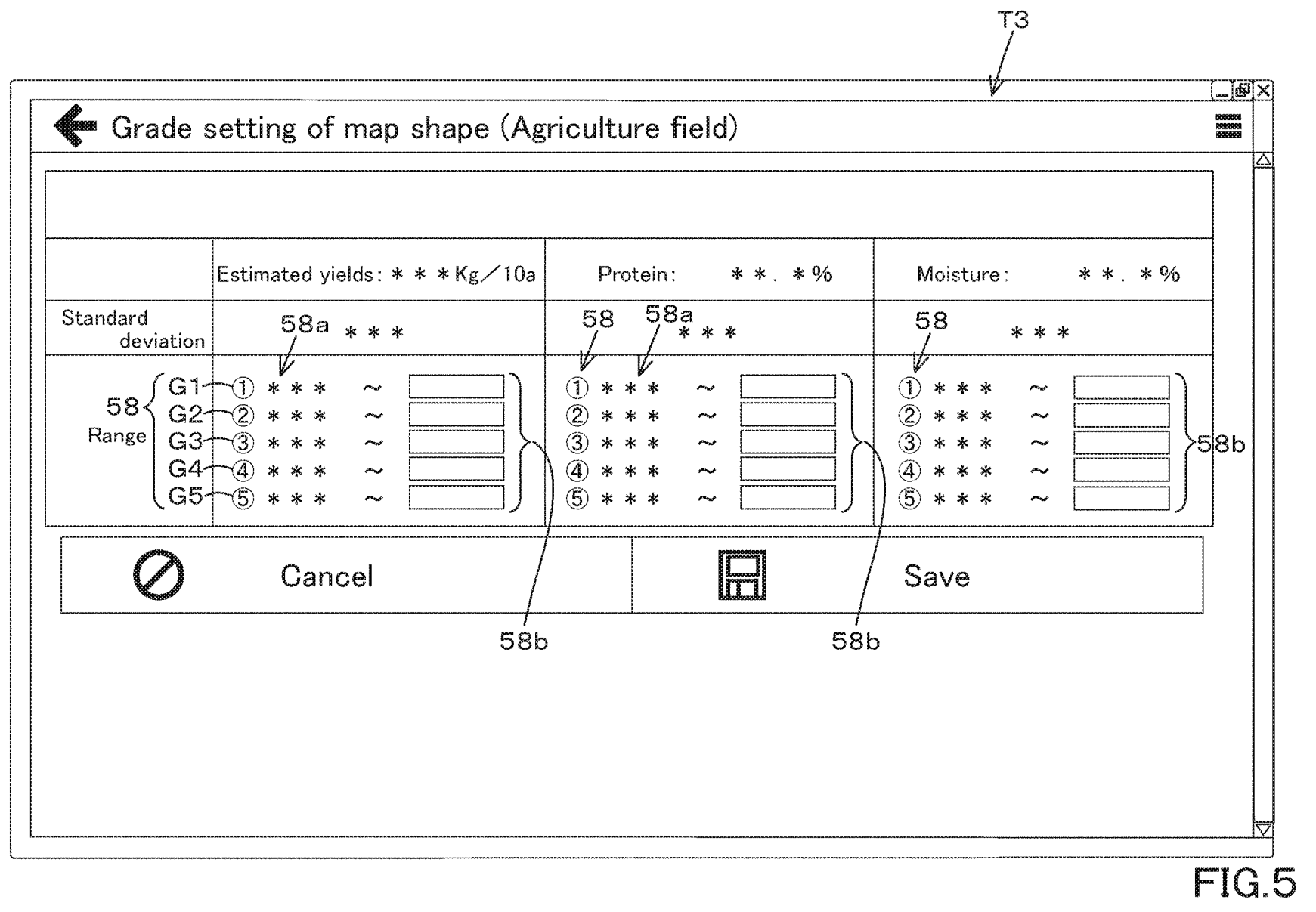

The group setting portion 12 has a reference changer portion 13. The reference changer portion 13 is constituted of an electric/electronic component provided in the server 1b, an electric circuit provided in the server 1b, and a computer program and the like stored in the server 1b. The reference changer portion 13 changes the reference value for dividing the divided data D1n for each area Qn into the groups. For example, when the reset button 55 displayed on the setting screen T1 is selected by an input interface or the like, the processing of the reference changer portion 13 starts, and the reference changer portion 13 displays the setting screen T3 on the management computer 1a as shown in FIG. 5. The reference setting portion 58 displays the information (the numbers, the characters, the colors, and the like) 58a for identifying the plurality of groups applied to the first agricultural field map (a selected agricultural field map) M1, and displays the reference input portion 58b for inputting the reference values (the upper limit value, the lower limit value) of the groups. An administrator or the like can input an arbitrary value (a numeral number) to the reference input portion 58b with used of an input interface. The group setting portion 12 (the reference changer portion 13) sets the value inputted to the reference input portion 55b for each group, and stores, in the server 1b, the relation between the groups and the set reference values (the upper limit value, the lower limit value) for each group as the group setting information.

The reference changer portion 13 is configured to set a reference value for each data. For example, individually for each of the yield data, the crops components data, the growth data, and the soil data, a reference value corresponding to the group can be set. In addition, the reference changer portion 13 can also change the number of groups. For example, the number of groups can be changed from "five" to "twenty" in twenty groups (in twenty steps).

In the embodiment described above, the spreading amount Pi for each area Qn is set by the spreading setting portion 11C. However, the spreading amount Pi for each area Qn set by the spreading setting portion 11C may be changed.

The server 1b has an spreading amount changer portion 14. The spreading amount changer portion 14 is constituted of an electric/electronic component provided in the server 1b, an electric circuit provided in the server 1b, a computer program and the like stored in the server 1b. The spreading amount changer portion 14 changes the spreading amount Pi for each area Qn.

Figure 6:
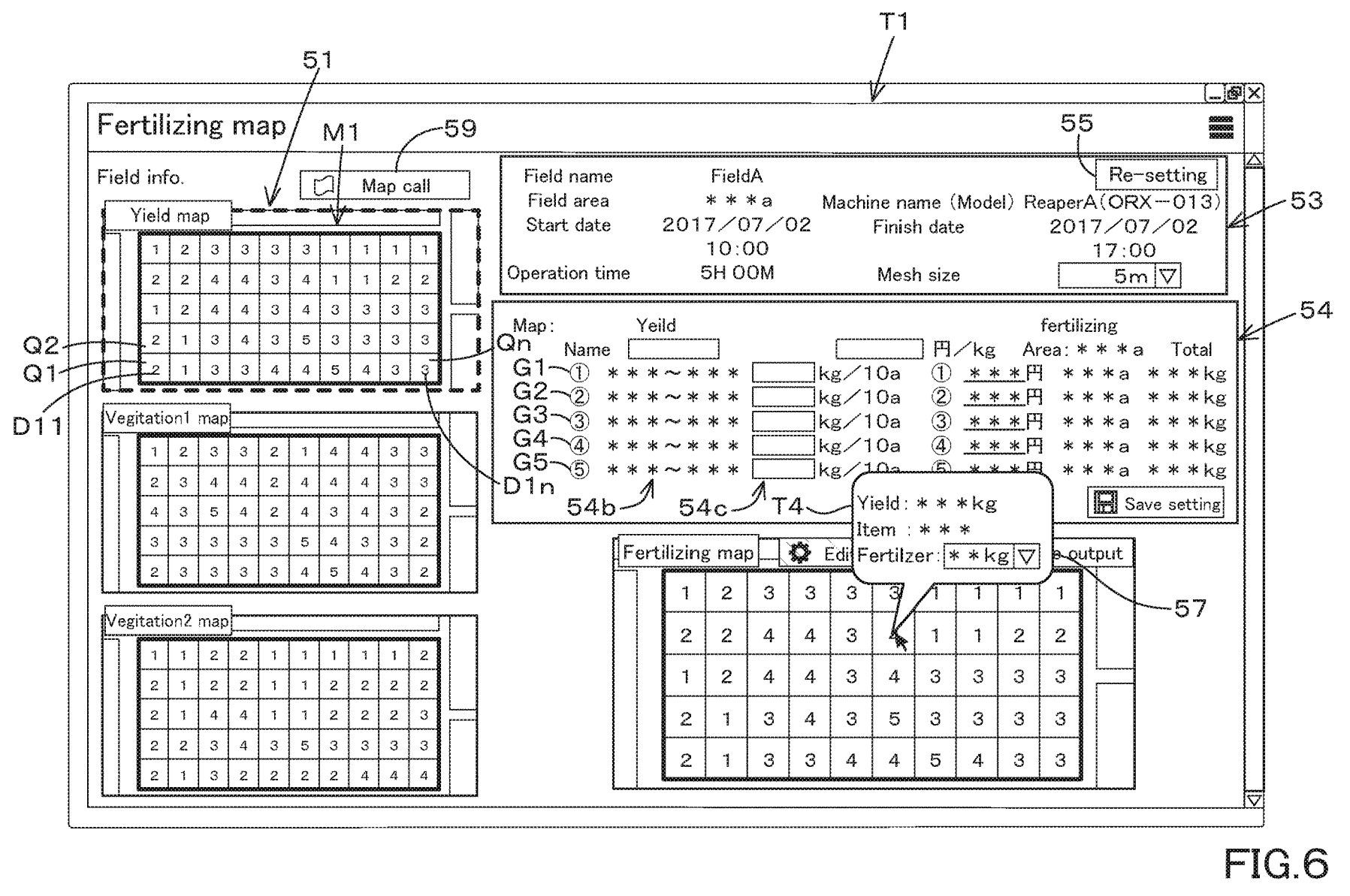

For example, when the edit button 56 displayed on the setting screen T1 is selected by an input interface or the like, the processing of the spreading amount changer portion 14 starts. After the processing of the spreading amount changer portion 14 is started, the spreading amount changer portion 14 changes the fertilization amount Pi corresponding to the selected area Qn when a predetermined area Qn is selected from among the plurality of areas Qn in the second agricultural field map M2 displayed on the setting screen T1. For example, when the selection area Qn is selected using the input interface, the spreading amount changer portion 14 displays a changer screen T4 on the setting screen T1 as shown in FIG. 6. In the changer screen T4, the value of the divided data D1n used for setting the fertilization amount Pi of the selection area Qn is displayed. For example, when the divided data D1n is the yield data, the yield indicated by the divided data D1n is displayed on the changer screen T4. In addition, the changer screen T4 displays an input portion (a change input portion) 57 for inputting the fertilization amount Pi corresponding to the area Qn. In the change input portion 57, an arbitrary number or the like can be inputted, or any one of numerical values prepared in advance in the change input portion 57 can be selected. When a numerical value is inputted to the change input portion 57 or a numerical value prepared in advance is selected, the spreading amount changer portion 14 converts the inputted numerical value or the selected numerical value into a fertilization amount corresponding to the area Qn, that is, the divided data D2n corresponding to the area Qn.

Thus, by selecting the area Qn displayed on the second agricultural field map M2 displayed on the setting screen T1, the fertilization amount corresponding to the selected area Qn can be changed.

According to the above, the agriculture support system includes the data obtaining portion 11A, the mesh setting portion 11B, the spreading setting portion 11C, the first map display portion 51, and the second map display portion 52.

The agriculture support system includes a group setting portion 12. In this manner, after displaying at least one first agricultural field map M1 assigned to each area such as the mesh in the agricultural field based on at least one of the plural types of data related to the crops planting, the operator, the management person, or the like can set the spreading amount for each area corresponding to the first agricultural field map M1 while viewing the situation indicated by the first agricultural field map M1. For example, as described above, an operator, a manager, or the like can set the spreading amount while looking at the yield map, and can confirm that the spreading amount is appropriate while looking at the spreading amount map M2. In other words, the operator, manager, or the like can easily set the spread amount based on the yield of the yield map M1, while watching the variation in the yield with the yield map M1, and the final confirmation can be made with the spread amount map after the setting.

The spreading setting portion 11C sets the spreading amount Pi for each area Qn in accordance with the set spreading amount determined for each group. In this manner, since the set spreading amount determined for each group is used, the spreading amount Pi for each area Qn can be easily set for each group. For example, as described above, when the groups are divided into five groups, the first group G1 to the fifth group G5, the spreading amount Pi for each area Qn can be set only with the five set spreading amounts corresponding to the five groups.

The agriculture support system includes an input portion 54c configured to input a set spreading amount for each group. The spreading amount Pi for each area Qn can be easily set simply by inputting the set spreading amount to the input portion 54c.

The agriculture support system includes the reference changer portion 13 configured to change the reference value with which the divided data D1n and D2n for each area Qn are divided into groups. According to this, since the reference value for setting the groups can be changed, it is possible to change the distribution with respect to the divided data D1n for each area Qn in the first agricultural field map M1 which is a base for setting the spreading amount. In other words, the correspondence between the divided data D1n for each area Qn in the first agricultural field map M1 and the divided data D2n for the area Qn in the second agricultural field map M2 can be changed in accordance with the group reference value, and it is possible to set the spreading amount more precisely by changing the reference value.

The agriculture support system includes the spreading amount changer portion 14 configured to change the spreading amount Pi for each area Qn set by the spreading setting portion 11C. In this manner, after setting the spreading amount Pi for each area Qn, the spreading amount Pi of an arbitrary area Qn can be changed.

Now, as shown in FIG. 1, the first spreading planning portion 11 may be provided with the auto determiner portion 11D. The auto determiner portion 11D is constituted of an electric/electronic component provided in the server 1b, an electric circuit provided in the server 1b, a computer program stored in the server 1b, and the like.

The auto determiner portion 11D automatically determines the set spreading amount to be inputted to the spreading inputting portion (an input portion) 54c of the setting screen T1.

For convenience of the explanation, the set spreading amount of the first input portion 54c1 is referred to as a "first set spreading amount P1", the set spreading amount of the second input portion 54c2 is referred to as a "second set spreading amount P2", the set spreading amount of the third input portion 54c3 is referred to as a "third set spreading amount P3", the set spreading amount of the fourth input portion 54c4 is referred to as a "fourth set spreading amount P4", and the set spreading amount of the fifth input portion 54c5 is referred to as a "fifth set spreading amount P5".

Figure 10A:
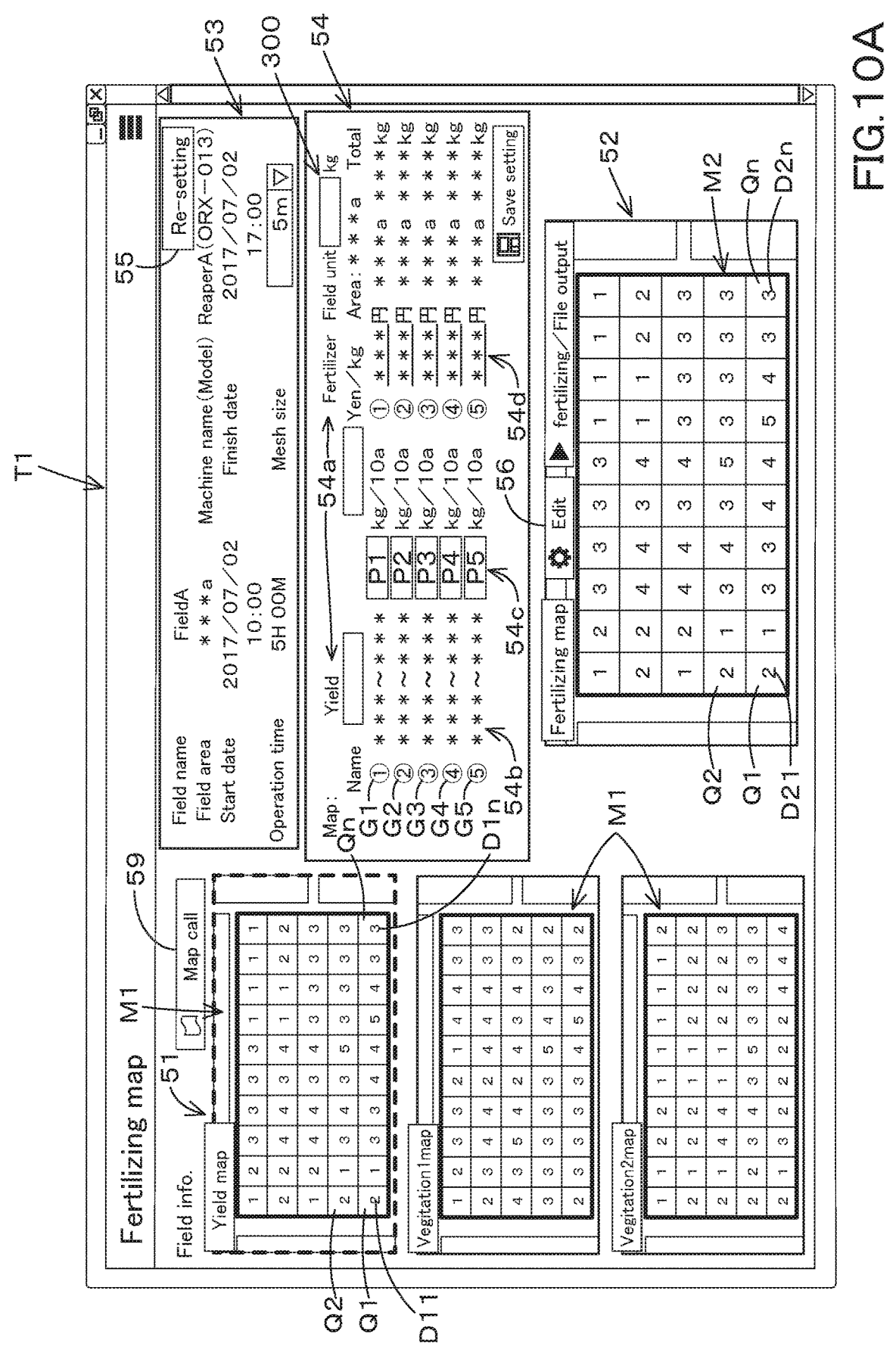
Figure 11A:
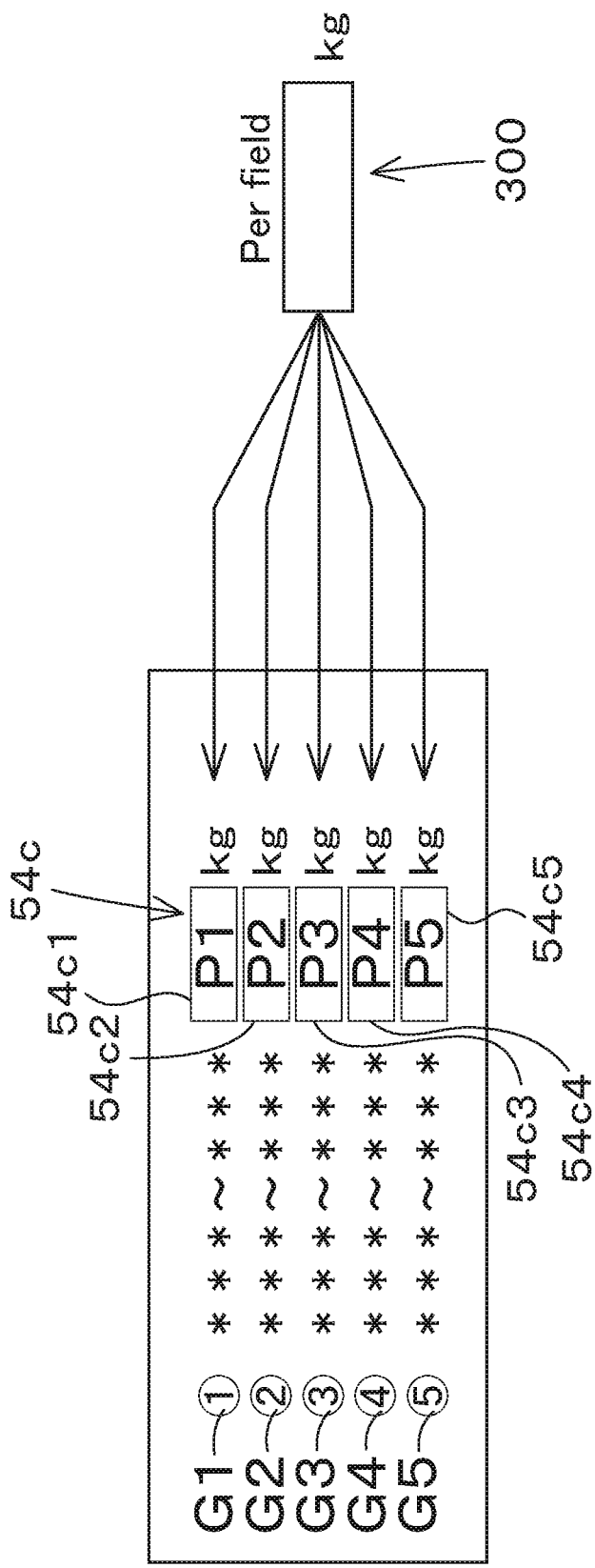
FIG. 11A is a view illustrating the way of setting a set spreading amount based on a field portion spreading amount according to the first embodiment.

As illustrated in FIG. 10A, the auto determiner portion 11D displays, on the setting screen T1, an agricultural field-unit input portion 300 to which a spreading amount (a field-unit spreading amount) per agricultural field to be spread is inputted. When the agricultural field-unit spreading amount is inputted to the agricultural field-unit input portion 300, as shown in FIG. 11A, the auto determiner portion 11D assigns the agricultural field-unit spreading amount to the first input portion 54c1, the second input portion 54c2, the third input portion 54c3, the fourth input portion 54c4, the fifth input portion 54c5 so that the sum of the first set spreading amount Pb, the second set spreading amount P2, the third set spreading amount P3, the fourth set spreading amount P4, and the fifth set spreading amount P5 matches with the agricultural field-unit spreading amount. More specifically, the auto determiner portion 11D sets the first set spreading amount P1 to the maximum and sets the fifth set spreading amount P5 to the minimum, and assigns the set spreading amount to each of the remaining second set spreading amount P2, the third set spreading amount P3, and the fourth set spreading amount P4.

According to the auto determiner portion 11D, it is possible to set the set spreading amount set for each group simply by inputting the agricultural field-unit spreading amount of the spread substance to be spread per field by the operator.

The auto determiner portion 11D described above sets the set spreading amount set for each group by inputting the agricultural field-unit spreading amount, but instead of this, the setting spreading amount for every group may be set by inputting the maximum value and the minimum value of the spreading amount per predetermined area.

Figure 10B:
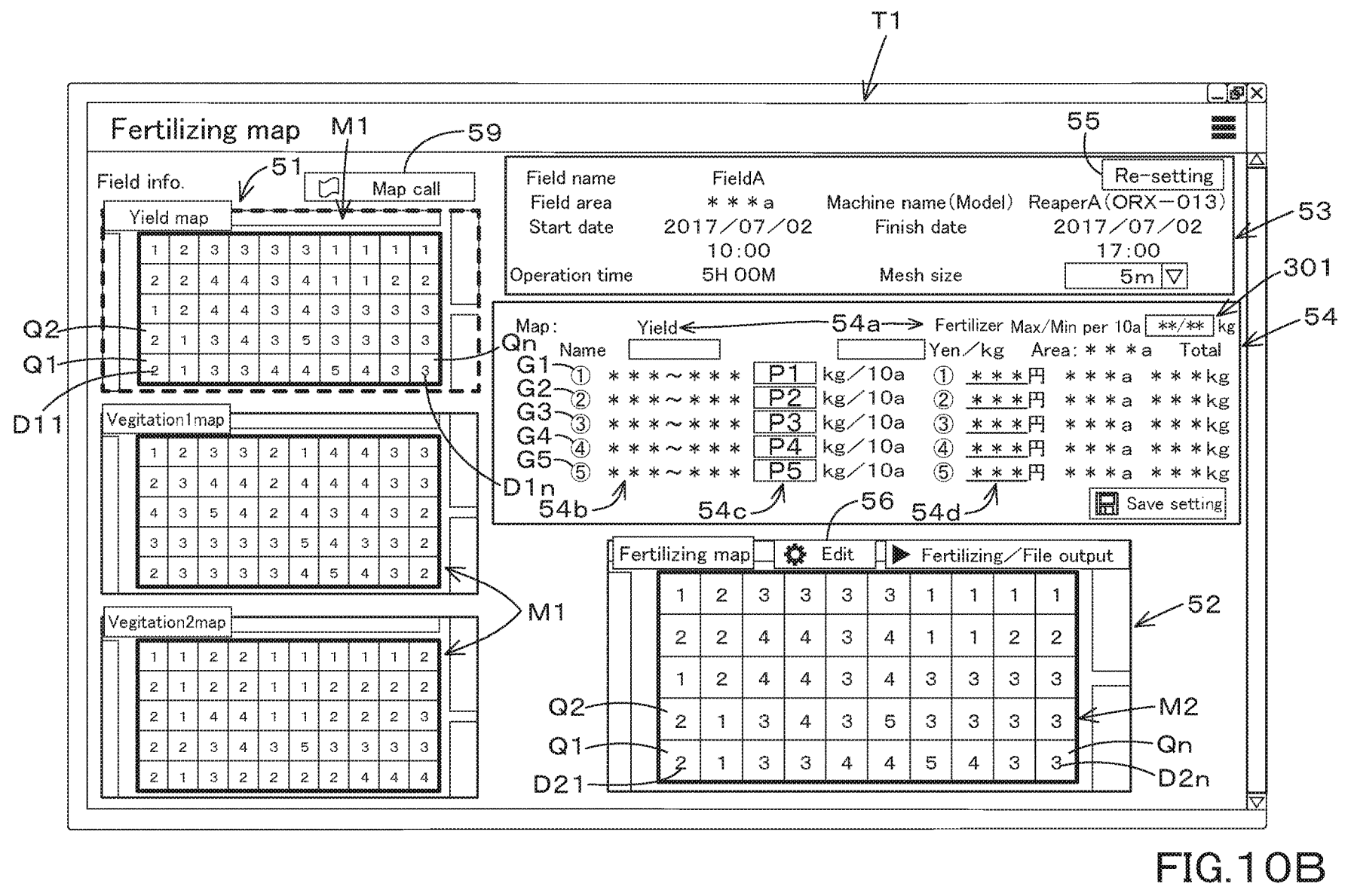
Figure 11B:
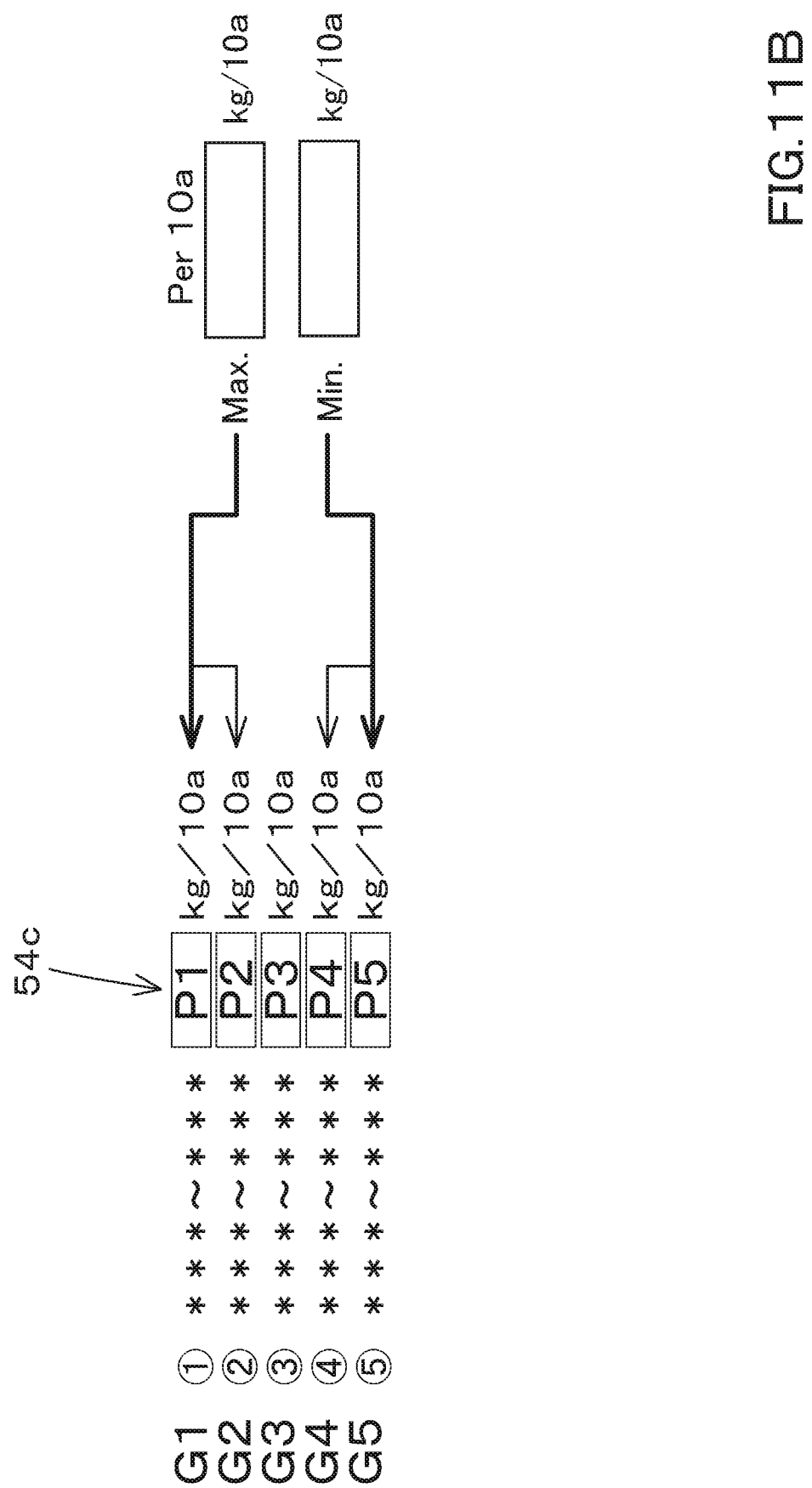
FIG. 11B is a view illustrating the way of setting the set spreading amount based on the maximum spreading amount and the minimum spreading amount per a predetermined area according to the first embodiment.

As shown in FIG. 10B, the auto determiner portion 11D displays, on the setting screen T1, an area-unit inputting portion 301 to which a spreading amount (unit-area spreading amount) spread per 10 are (10a) is inputted. The area-unit inputting portion 301 can receive the maximum value (the maximum spreading amount) of the spread substance per predetermined area and the minimum value (the minimum spreading amount) of the spread substance per predetermined area. When the maximum spreading amount and the minimum spreading amount are inputted to the area-unit inputting portion 301, the auto determiner portion 11D sets the first set spreading amount P1 to the maximum spreading amount and sets the fifth set spreading amount P5 to the minimum spread amount as shown in FIG. 11B. In addition, the auto determiner portion 11D determines the second set spreading amount P2 as a value obtained by subtracting a predetermined amount from the maximum spreading amount, determines the fourth set spreading amount P4 as a value obtained by adding the predetermined amount to the minimum spreading amount, and then, sets the third set spreading amount P3 is to be larger than the fourth set spreading amount P4 and less than the second set spreading amount P2.

According to the auto determiner portion 11D, it is possible to set the set spreading amount set for each group simply by inputting the maximum value and the minimum value of the unit-area spreading amount of the spread substance to be spread per predetermined area by the operator.

In the embodiment described above, a spreading plan is created using at least one data (one type of data) among the crops data (the yield data, the crops components data, the growth data, the soil data). However, the spreading plan may be created using at least two data (two types of data) among the crops data (the yield data, the crops components data, the growth data, the soil data).

The server 1b includes a second spreading planning portion 15. The second spreading planning portion 15 is constituted of an electric/electronic component provided in the server 1b, an electric circuit provided in the server 1b, a computer program stored in the server 1b, and the like.

The second spreading planning portion 15 creates a spreading plan for the spreading on the agricultural field using at least two data (two types of data) among the crops data (the yield data, the crops components data, the growth data, the soil data).

Figure 7:
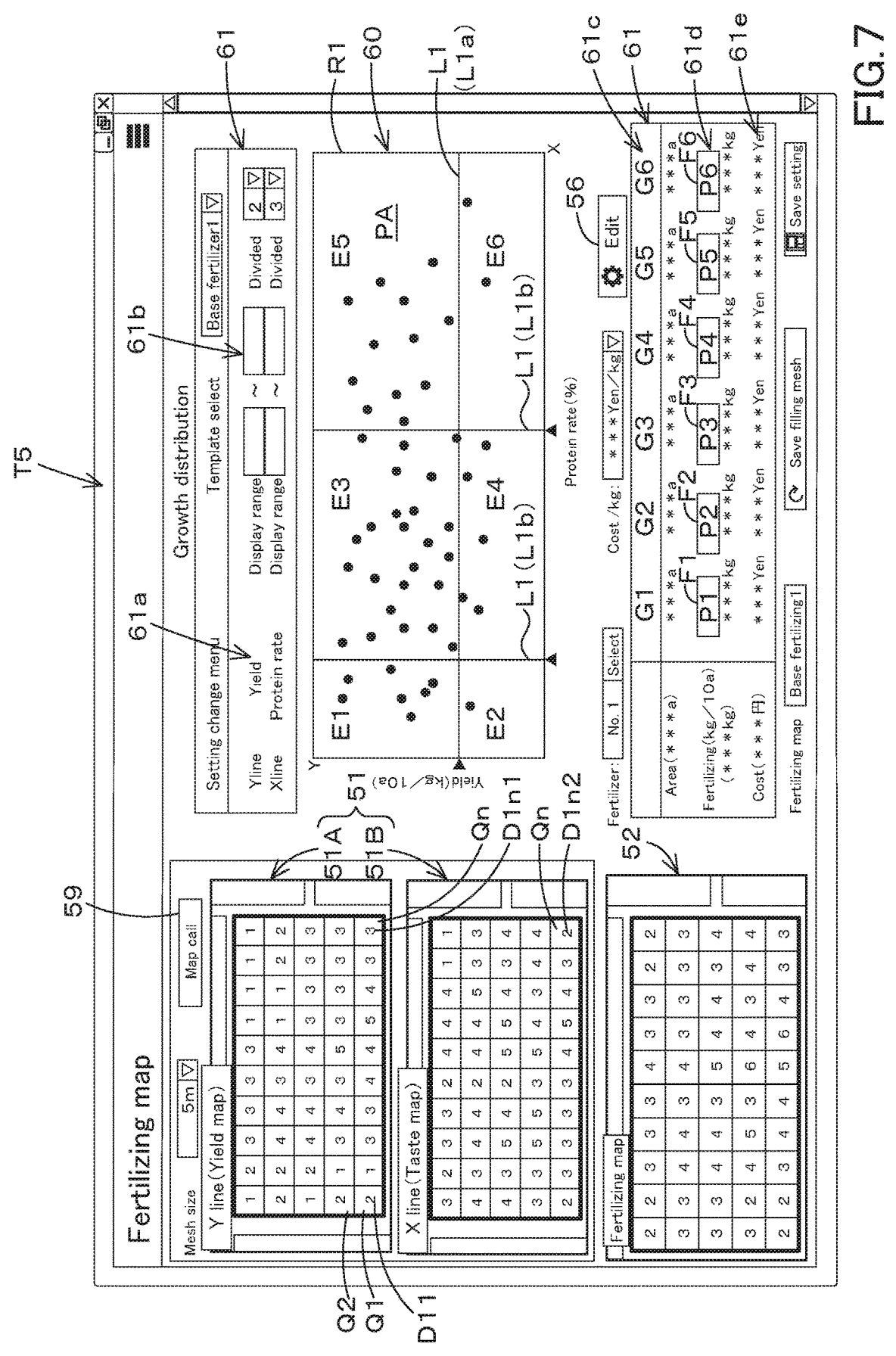

For example, when the management computer 1a logs in to the server 1b, a menu screen for selecting a menu or the like is displayed on the display portion 40 of the management computer 1a. When an icon, a button, or the like for the spreading plan is selected on the menu screen and then a predetermined operation is performed, the management computer 1a requests the server 1b to create a spreading plan. As shown in FIG. 7, the second spreading planning portion 15 of the server 1b displays a setting screen T5 on the management computer 1a.

The setting screen T5 includes a first map display portion 51 and a second map display portion 52. The first map display portion 51 displays a map obtained from the data to be referred to in creating the spreading plan. For example, the first map display portion 51 displays the first agricultural field map created individually [the yield map, the crops component map (the moisture map, the taste map, and the like), the growth map, the soil map] M1] based on each of the yield data, the crops components data (the moisture content rate, the protein content rate), the growth data, and the soil data.

In particular, the first map display portion 51 includes a map display portion 51A configured to display the first agricultural field map M1, and includes a map display portion 51B configured to display the first agricultural field map M1 different from the map display portion 51A. That is, the first map display portion 51 displays at least two first agricultural field maps M1 each having different data.

The second map display portion 52 displays a second agricultural field map (the fertilization amount map) M2 including the spreading amount that is set based on the first agricultural field map M1 displayed on the first map display portion 51.

The setting screen T5 includes a data display portion 60 and a spreading planning portion 61. The data display portion 60 displays the divided data D1$nj$ (n: the number of areas=1, 2, 3, . . . , n, j: the number of first agricultural field maps=1, 2, 3, . . . , J) corresponding to the area Qn of the first agricultural field map M1. The data display portion 60 displays at least two pieces of divided data D1$nj$ (j≥2 or more) on the distribution map R1 having a plurality of indexes. For example, when there are two first agricultural field maps M1, the data display portion 60 first sets the index of the distribution map R1 to a first index corresponding to the vertical axis (Y coordinate) and to a second index corresponding to the horizontal axis (X coordinate) in accordance with the number of the first agricultural field maps M1.

In addition, the data display portion 60 associates the divided data D1$n$1 in the area Qn of the first one of the first agricultural field maps M1 with the Y coordinate of the distribution map R1, associates the divided data D1$n$1 in the area Qn of the second one of the first agricultural field maps M1 with the X coordinate of the distribution map R1, and the divided data D1$n$1 and the divided data D1$n$2 in the same area Qn are plotted on the distribution map R1. That is, when there are two first agricultural field maps M1, the data display portion 60 displays the divided data D1$n$1 and D1$n$2 in a two-dimensional graph. For example, when the first one of the first agricultural field maps M1 is the "yield map" and the second one of the first agricultural field maps M1 is the "taste map", the data display portion 60 displays, on distribution map R1, the relation between the yield and the protein content in the identical area Qn in the yield map and the taste map.

The spreading planning portion 61 is a portion capable of inputting information necessary for setting the spreading amount, and includes a name display portion 61a, a graph setting portion 61b, a group display portion 61c, a spread input portion (input portion) 61d, and a cost display portion 61e.

The name display portion 61a displays the name of the first agricultural field map M1 selected by the first map display portion 51. The graph setting portion 61b is a portion configured to set the number of divisions of the plot area PA in the plot area PA of the distribution map R1. In other words, the graph setting portion 61b is a portion configured to divide the plot area PA of the distribution map R1 into a predetermined range.

For example, when the distribution map R1 is a two-dimensional graph having a first index (Y coordinate) and a second index (X coordinate), the graph setting portion 61b is capable of setting the number of divisions in the Y coordinate direction and the number of divisions in the X coordinate direction in the plot area PA. Here, when the division number in the Y coordinate direction is set to "two" and the division number in the X coordinate direction is set to "three", the graph setting portion 61b divides the plot area PA vertically into two parts and horizontally into three parts, into six parts in total. The graph setting portion 61b is configured to set the maximum value and the minimum value of the first index (Y coordinate) and the maximum value and the minimum value of the second index (X coordinate) in the distribution map R1.

The group display portion 61c displays a plurality of groups set in the distribution map R1. As described above, when the plot area PA of the distribution map R1 is divided in plural, the same number of groups as the number of divisions of the plot area PA are displayed. In the distribution map R1, when the plot area PA is divided into six predetermined areas (E1 to E6), the group display portion 61c displays the groups corresponding to the predetermined areas E1 to E6, that is, the "first group G1" corresponding to the predetermined area E1, the "second group G2" corresponding to the predetermined area E2, the "third group G3" corresponding to the predetermined area E3, the "fourth group G4" corresponding to the predetermined area E4, the "fifth group G5" corresponding to the predetermined area E5, and the "sixth group G6" corresponding to the predetermined area E6.

In the plot area PA of the distribution map R1, the boundary lines L1 of the predetermined areas E1 to E6 are displayed. The boundary lines L1 indicate the upper limit values or the lower limit values of the predetermined ranges E1 to E6. The boundary lines L1 can be moved in the vertical direction and in the horizontal direction on the distribution map R1 with use of an input interface or the like, whereby the upper limit values or the lower limit values of the groups can be set.

The spread input portion 61d is a portion for inputting a set spreading amount that is set for each group. The spread input portion 61c includes a first input portion F1 that inputs a set spreading amount corresponding to the first group G1, a second input portion F2 that inputs a set spreading amount corresponding to the second group G2, a third input portion F3 that inputs a set spreading amount corresponding to the third group G3, a fourth input portion F4 that inputs a set spreading amount corresponding to the fourth group G4, a fifth input portion F5 that inputs a set spreading amount corresponding to the fifth group G5, and a sixth input portion F6 that inputs a set spreading amount corresponding to the sixth group G6.

The value (the set spreading amount) to be inputted to the spreading inputting portion 61d may be a spreading amount per unit area, or may be a value arbitrarily determined.

The cost display portion 61e displays the purchase cost of the spread substance for each group based on the set spreading amount inputted to the spreading input portion 61d. For example, the purchase cost of the spread substance for each group is calculated and displayed based on the purchase cost of the spread substance per kilogram.

Thus, an administrator, an operator, or the like can set the spreading amount in the agricultural field for each predetermined area with use of the setting screen T5 displayed on the display portion 40 of the management computer 1a.

Next, the operation of the server 1a (the second spreading planning portion 15) in the operation of the setting screen T5 and the method of creating the spreading plan (the setting of spreading amount) will be described in detail.

The second spreading planning portion 15 includes a data obtaining portion 15A, a mesh setting portion 15B, a spreading setting portion 15C, and a group setting portion 16. The data obtaining portion 15A, the mesh setting portion 15B, the spreading setting portion 15C. The group setting portion 16 is constituted of an electric/electronic component provided in the server 1b, an electric circuit provided in the server 1b, a computer program stored in the server 1b, and the like.

The data obtaining portion 15A executes a process of obtaining data including at least two types of the data relating to the crops planting (the obtaining step). For example, when the map call button 59 is selected by the input interface on the setting screen T5, the data obtaining portion 15A is activated to start the obtaining step, and the data obtaining portion 15A refers to the database (the storage portion) of the server 1b, and then displays a list T6 of the data (the yield data, the crops components data, the growth data, the soil data) is displayed on the management computer 1a as shown in FIG. 8.

In the list T6, at least two or more types of data can be selected. In this embodiment, the list T6 can select two types of data. The first one of the data is data corresponding to the Y coordinate in the distribution map R1, and the second one of the data is the X coordinate in the distribution map R1. The data obtaining portion 15A calls, from the storage portion 10, the data selected from the list T6 to obtain the agricultural field data corresponding to two agricultural fields from the storage portion 10, and then the obtaining step ends.

The mesh setting portion 15B performs a process of assigning at least two types of agricultural field data obtained by the data obtaining portion 15A to each area Qn in the agricultural field (the mesh setting step). For example, the mesh setting portion 15B assigns the divided data D1n1 of the first one of the field data (the first field data) to each area Qn in the agricultural field, and assigns the divided data D1n2 of the second one of the field data (the second field data) is assigned to each area Qn in the agricultural field.

In the mesh setting portion 15B, the method of assigning the area Qn to the first field data and the second field data is the same as that of the mesh setting portion 11B.

The first map display portion 51 displays, as the first agricultural field map M1, the divided data D1nj (j≥2) for each area Qn assigned by the mesh setting portion 15B. For example, the map display portion 51A of the first map display portion 51 displays the first agricultural field map M1 indicated by the divided data D1n1 corresponding to the area Qn, and the map display portion 51B of the first map display portion 51 displays the first agricultural field map M1 indicated by the divided data D1n2 corresponding to the area Qn. For example, the map display portion 51A displays the yield map when the first field data is the yield data. The map display portion 51B displays the taste map (the map which shows protein content rate), when the second field data is the crops contents data which shows the protein content rate.

The data display portion 60 displays, on the distribution map R1, the divided data D1n1 corresponding to the area Qn of the first agricultural field map M1 and the divided data D1n2 corresponding to the area Qn of the first agricultural field map M1. In the distribution map R1, the data display portion 60 sets that [X coordinate value, Y coordinate value]=[D1n2, D1n1 (n=1, 2, 3, ..., N)], and displays the divided data D1n1 and the divided data D1n2 on the distribution map R1. The data display portion 60 displays, as a two-dimensional distribution map R1, the relation between the yield of the area Qn of the yield map (the division data D1n1) and the protein content rate of the area Qn of the taste map (the division data D1n2), for example.

The group setting portion 16 sets the groups for divided data Dnj corresponding to the same area Qn among at least two types of divided data Dnj. The group setting portion 16 sets, as one group, the divided data Dnj [D1nj=2), D1nj (j=1)] within one predetermined area shown in the distribution map R1.

For example, for example, the group setting portion 16 sets the divided data [D1n2, D1n1] that falls within the predetermined range E1 to the first group G1, sets the divided data that falls within the predetermined range E2 to the second group G2, sets the divided data that falls within the predetermined range E3 to the third group G3, sets the divided data that falls within the predetermined range E4 to the fourth group G4, sets the divided data that falls within the predetermined range E5 to the fifth group G5, and sets the divided data that falls within the predetermined range E6 to the sixth group G6.

The group setting portion 16 includes a threshold setting portion 18. The threshold setting portion 18 is constituted of an electric/electronic component provided in the server 1b, an electric circuit provided in the server 1b, a computer program stored in the server 1b, and the like.

In the setting screen T5, the reference values (the upper limit values or the lower limit values) of the predetermined ranges E1 to E6 can be changed by moving the boundary lines L1 of the distribution map R1 with use of the input interface. As shown in FIG. 7, for example, when the boundary line L1 (L1a) moves up or down, the threshold setting portion 18 reads the Y coordinate value (a set value to the Y coordinate) in the boundary line L1a after the movement, and sets the lower limit values in the first index of the predetermined areas E1, E3, and E5 and sets the upper limit value in the first index of the predetermined areas E2, E4, and E6, as the set values to the Y coordinate. That is, the threshold setting portion 18 sets the lower limit values of the reference values in the first index of the groups G1, G3, and G5 and sets the upper limit values of the reference values in the second index of the groups G2, G4, and G6.

In addition, when the boundary line L1b on the right of the boundary line L1 (L1b) is moved to the left or the right, the threshold setting portion 18 reads the X coordinate value (a set value to the X coordinate) in the boundary line L1b after the movement, and sets the upper limit values in the second index of the predetermined areas E3 and E4 and sets the lower limit value in the second index of the predetermined areas E5 and E6, as the set values to the X coordinate. That is, the threshold setting portion 18 sets the lower limit values of the reference values in the second index of the groups G3 and G4 and sets the upper limit values of the reference values in the second index of the groups G2, G4, and G6.

In this manner, the setting screen T5 allows to set the groups G1 to G6 with use of the boundary lines L1 and the like while viewing the distribution map R1.

The spread setting portion 15C sets the spreading amount of the spread substance for each area Qn based on at least two types of divided data D1nj assigned to each area Qn (the spreading setting step). For example, the spread setting portion 15C sets the spreading amount for each area Qn in accordance with the set spreading amount determined for each group. When the set spreading amount for each group inputted to the spreading inputting portion 61d is represented by "Pi (i=a number of the group)", the spread setting portion 15C sets the set spreading amount Pi as the spreading amount Ri for each area Qn.

For example, when there are six groups, the spread setting portion 15C sets the set spreading amount P1 for the first group G1 as the spreading amount R1 for each area Qn, sets the set spreading amount P2 for the second group G2 as the spreading amount R2 for each area Qn, sets the set spreading amount P3 for the third group G3 as the spreading amount R3 for each area Qn, sets the set spreading amount P4 for the fourth group G4 as the spreading amount R4 for each area Qn, sets the set spreading amount P5 for the fifth group G5 as the spreading amount R5 for each area Qn, and sets the set spreading amount P6 for the sixth group G6 as the spreading amount R6 for each area Qn. That is, the spread setting portion 15C associates the spreading amount Pi for each area Qn with the divided data D2n corresponding to the area Qn in the second agricultural field map M2 (the spreading amount Pi for each area Qn=the divided data D2n).

The second map display portion 52 displays the spreading amount Pi for each area Qn set by the spread setting portion 15C as the second agricultural field map M2 in correspondence with the position of the agricultural field. That is, the raw value of the divided data D2n (the spreading amount Pi for each area Qn) corresponding to the area Qn set by the spreading setting portion 15C is displayed on the setting screen T5.

In this embodiment, regarding the displaying of the divided data D2n, the divided data D2n may be divided into a plurality of groups set by the group setting portion 12, and the information indicating the group may be displayed on the setting screen T5, thereby displaying the divided data D2n for the area Qn.

The agriculture support system includes the data obtaining portion 15A, the mesh setting portion 15B, and the spreading setting portion 15C. According to this configuration, after displaying at least two first agricultural field maps M1 assigned to each area such as the meshes in the agricultural field on the basis of the data including at least two of the plurality of data related to the crops planting, the operator, the administrator, or the like can set the spreading amount for each area corresponding to the first agricultural field map M1 while watching the situation indicated by the first agricultural field map M1. For example, as described above, an operator, a manager, or the like can set the spreading amount while watching the yield map, and can check whether the spreading amount is appropriate while watching the spreading amount map M2. In other words, the operator, manager, or the like can easily set the spread amount based on the yield of the yield map M1, while watching the variation in the yield in the yield map M1, and the final confirmation can be made with the spread amount map after the setting.

The agriculture support system includes the group setting portion 16, and the spread setting portion sets the spreading amount for each area based on the group set by the group setting portion 16. According to this configuration, when two types of data are selected, the data can be set to the plurality of groups corresponding to the divided data corresponding to the same area Qn, the divided data being included in the same data. In addition, the spreading amount Pi of the area Qn can be easily set for each group. For example, as described above, the groups corresponding to the same area in the yield map and in the taste map can be set. In addition, when the group is divided into five groups, the first group G1 to the fifth group G5, the spreading amount Pi of the area Qn can be set with only five set spreading amounts corresponding to the five groups.

The agriculture support system includes the data display portion 60. The data display portion 60 can display, as a distribution map, two divided data in the yield map and in the taste map, for example. In this manner, an operator, an administrator, or the like can grasp easily the relation between the yield and the taste by watching a distribution map.

The data display portion 60 displays a distribution map that represents the first index on the vertical axis and the second index on the horizontal axis among the plurality of indexes, and the group setting portion 16 displays groups for each predetermined area shown in the distribution map. In this manner, an operator, a manager, or the like can easily set the group while watching the distribution map in consideration of the variation shown in the distribution map while grasping the relation between the yield and the taste.

The agriculture support system includes the threshold setting portion 18 configured to set an upper limit value or a lower limit value of a predetermined area. According to this configuration, the threshold value setting portion 18 can easily set, on the distribution diagram, the upper limit value and the lower limit value corresponding to the group.

The agriculture support system includes the spreading amount changer portion 14. According to this configuration, after setting the spreading amount Pi for each area Qn, the spreading amount Pi of an arbitrary area Qn can be changed.

The agriculture support system includes the map display portion 52. According to this configuration, the spreading amount Pi for each area Qn can be displayed as an agricultural field map in correspondence with the position in the agricultural field, and the tendency of the spreading amount to the agricultural field can be grasped.

It is preferable that the spreading amount set by the spreading setting portion 15C can be changed in the setting screen T5. For example, when the edit button 56 displayed on the setting screen T5 is selected by an input interface or the like, the processing of the spreading amount changer portion 14 starts. After the processing of the spreading amount changer portion 14 starts, when a predetermined area Qn is selected from among the plurality of areas Qn in the second agricultural field map M2 displayed on the setting screen T5, the spreading amount changer portion 14 changes the fertilization amount Pi corresponding to the selected area Qn. The operation of the spreading amount changer portion 14 is the same as the operation of the above-described embodiment.

The mesh setting portion 11B assigns the divided data D1$n$ to the area Qn. However, when the divided data D1$n$ does not exist in the area Qn, that is, when the divided data D1$n$ is missing, it is preferred to interpolate a value of the portion where the divided data D$in$ does not exist (missing data).

Figure 9:
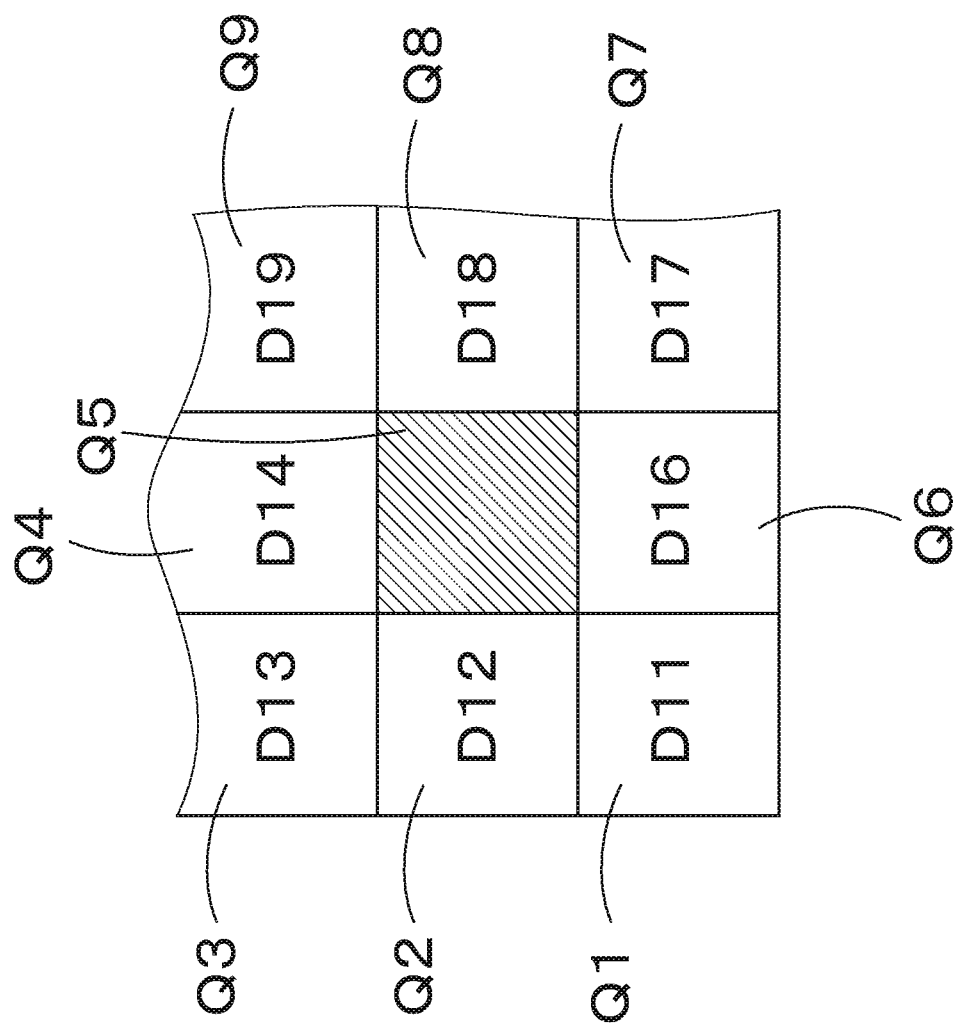
FIG. 9 is a view illustrating the way of filling a blank of data according to the first embodiment.

For example, as shown in FIG. 9, when the divided data D15 of the area Q5 does not exist in the areas Q1 to Q9, the mesh setting portion 11B sets, as a value of the divided data D15, the average value of the divided data D11 to D14 and the divided data D16 to D19 in the areas (Q1 to Q4, Q6 to Q9) surrounded by the area Q5, for example. That is, when there is the missing data, the mesh setting portion 11B interpolates the missing data with use of the divided data D1$n$ of the area Qn around the area Qn of the missing data. Similar to the mesh setting portion 11B, the mesh setting portion 15B may preferably interpolate the missing data.

In addition, the server 1$b$ includes the spread transmitter portion 19. The spread transmission portion 19 is constituted of an electric/electronic component provided in the server 1$b$, an electric circuit provided in the server 1$b$, a computer program stored in the server 1$b$, and the like. When the spreading amount Pi for each area Qn is set by the first spreading planning portion 11 or the second application planning portion 15, the spread transmitter portion 19 transmits the spreading amount Pi for each area Qn, that is, transmits, to the spreader 70, the position information indicating a position of the area Qn and the spreading amount Pi. The spreader 70 includes the position detector device 70$a$ configured to detect a position (the latitude, the longitude) based on a signal from a positioning satellite or the like, and includes a communication device 70$b$ configured to receive the spreading amount Pi for each area Qn transmitted from the spread transmitter portion 19 or the like. Thus, the spreader machine 70 can spread the spread substance corresponding to the spreading amount Pi of the area Qn based on the spreading plan.

Second Embodiment

Figure 12:
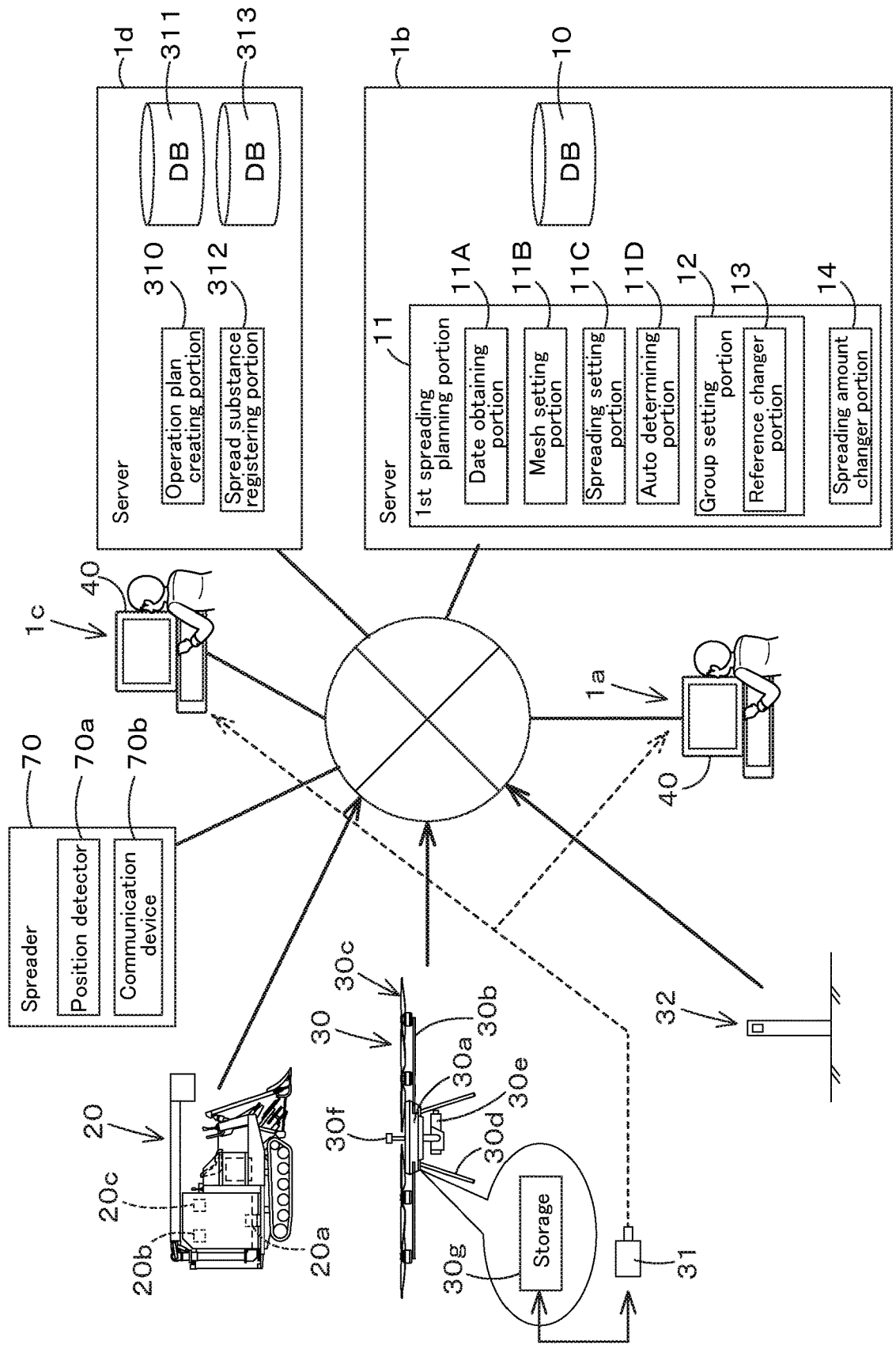
FIG. 12 is a view illustrating an agriculture support system according to a second embodiment of the present invention.

FIG. 12 is a diagram showing an agriculture support system according to a second embodiment of the present invention. The agriculture support system according to the second embodiment is a system that carries out a spreading plan by linking at least two servers. In the second embodiment, the description of configurations same as those of the first embodiment is omitted.

As shown in FIG. 12, the agriculture support system includes a server 1$b$ and a server 1$d$. The server 1$d$ has an operation plan creating portion 310. The operation plan creating portion 310 is constituted of an electric/electronic component provided in the server 1$b$, an electric circuit, a computer program or the like stored in the server 1$b$.

Figure 13:
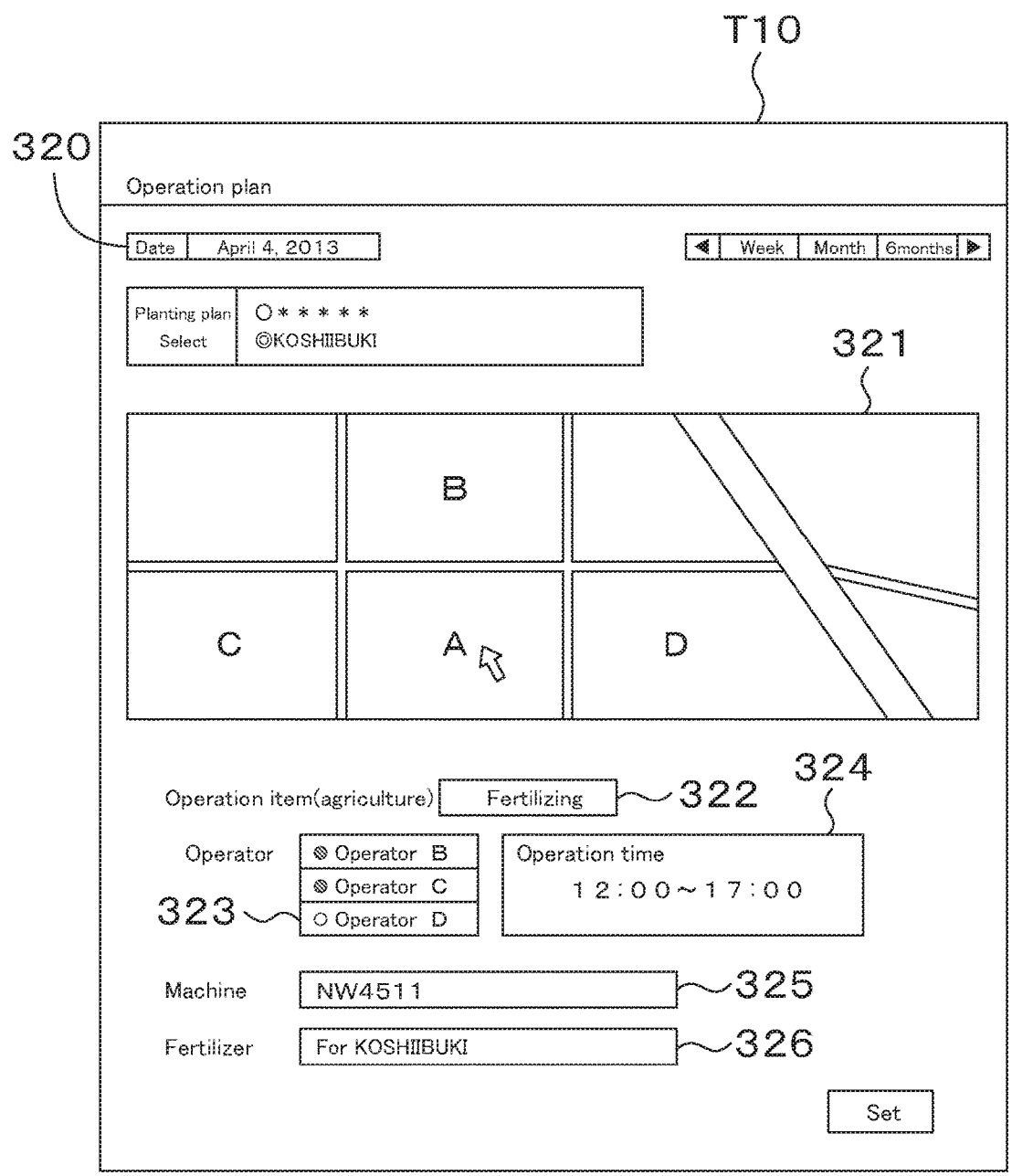
FIG. 13 is a view illustrating an operation planning screen T10 according to the second embodiment.

The operation plan creating portion 310 creates an operation plan corresponding to the spreading plan. When the management computer 1$a$ is connected to the server 1$d$ and the management computer 1$a$ requests the server 1$d$ to create the operation plan, the operation plan creating portion 310 displays an operation plan screen T10 on the display portion 40 of the management computer 1$a$ as shown in FIG. 13.

The operation plan screen T10 includes a date setting portion 320 for setting a date for performing an agricultural operation, an agricultural field selecting portion 321 for selecting an agricultural field, an operation selecting portion 322 for selecting the agricultural operation, an operator selecting portion 323 for selecting an operator, a time setting portion 324 for setting an operation time, a machine selecting portion 325 for selecting a machine, and a spreading selecting portion 326 for setting the spread substance.

The agricultural field selecting portion 321 displays a agricultural field map different from the first agricultural field map M1 and the second agricultural field map M2, for example, displays an aerial image of the agricultural field, and selects an agricultural field on which agricultural operation is performed with use of an input interface such as a mouse or a keyboard. The operation selecting portion 322 can set various types of agricultural operation including the spreading operation (the spreading of fertilizer, the spreading of cropping material). The operator selecting portion 323 displays a list of operators registered in advance, and is capable of selecting the operator name who performs the agricultural operation. The time setting portion 324 is capable of inputting the operation time for performing the agricultural operation, for example, inputting an operation start time and an operation finish time. The machine selecting portion 325 is capable of selecting a machine to be used in the agricultural operation. The spreading selecting portion 326 is capable of selecting the name of the spread substance.

Thus, the operation plan creating portion 310 is capable of creating an operation plan including the date, the agricultural field, the agricultural operation, the operator, the operation time, the machine, and the spread substance. The operation plan created by the operation plan creating portion 310 can be stored in the database (the storage portion) 311 and can be confirmed by the administrator or the operator with use of the management computer 1a or the like.

Now, in addition to the creating of the operation plan, the server 1d (the operation plan creating portion 310) is capable of registering the spread substance. The server 1d includes a spread substance registering portion 312. The spread substance registering portion 312 is constituted of an electric/electronic component provided in the server 1d, an electric circuit, a computer program stored in the server 1b.

When the management computer 1a is connected to the server 1d and the management computer 1a requests the server 1d to register the spread substance, the spread substance registering portion 312 displays the spread substance registering screen T11 on the display portion 40 of the management computer 1a as shown in FIG. 14.

The spread substance registering screen T11 includes a name inputting portion 330 for inputting the name of the spread substance, a manufacture inputting portion 331 for inputting the manufacturer of the spread substance, a usage inputting portion 332 for inputting the usage of the spread substance, and a components inputting portion 333 for inputting three major elements such as Nitrogen (N), Phosphorus (P), Potassium (K), and the like, a weight inputting portion 334 for inputting the weight per bag, and a criterion spreading inputting portion 335 for inputting a spreading amount per a predetermined area (a criterion spreading amount).

By inputting information to each of the name inputting portion 330, the manufacture inputting portion 331, the usage inputting portion 332, the components inputting portion 333, the weight inputting portion 334, and the criterion spreading inputting portion 335 on the spread substance registering screen T11, the spread substance can be registered. In other words, the spread substance registering portion 312 is capable of registering, to the server 1d, the spread substance registration information such as the name of spread substance, the manufacturer, the usage, the three major components, the weight, and the criterion spreading amount. The spread substance registration information registered by the spread substance registering portion 312 can be stored in the database (the storage portion) 313, and can be confirmed by an administrator or an operator with use of the management computer 1a or the like. In addition, the server 1b is capable of referring to and obtaining the spread substance registration information stored in the database (the storage portion) 313 at the time of preparing a spreading plan.

The auto determiner portion 11D of the server 1b automatically determines the set spreading amount to be inputted to the spreading inputting portion (the inputting portion) 54c of the setting screen T1, using the spread substance registration information stored in the database 313 of the server 1d.

In the setting screen T1, when either one of the spreading input portion 54c and the call button (not shown in the drawings) displayed on the setting screen T1 is selected, the auto determiner portion 11D refers to the spread substance registration information stored in the database 313 of the server 1d, and obtains the criterion spreading amount of the same spread substance shown in the name in the spreading planning portion 54 on the setting screen T1 (the name of the spread substance).

Figure 15A:
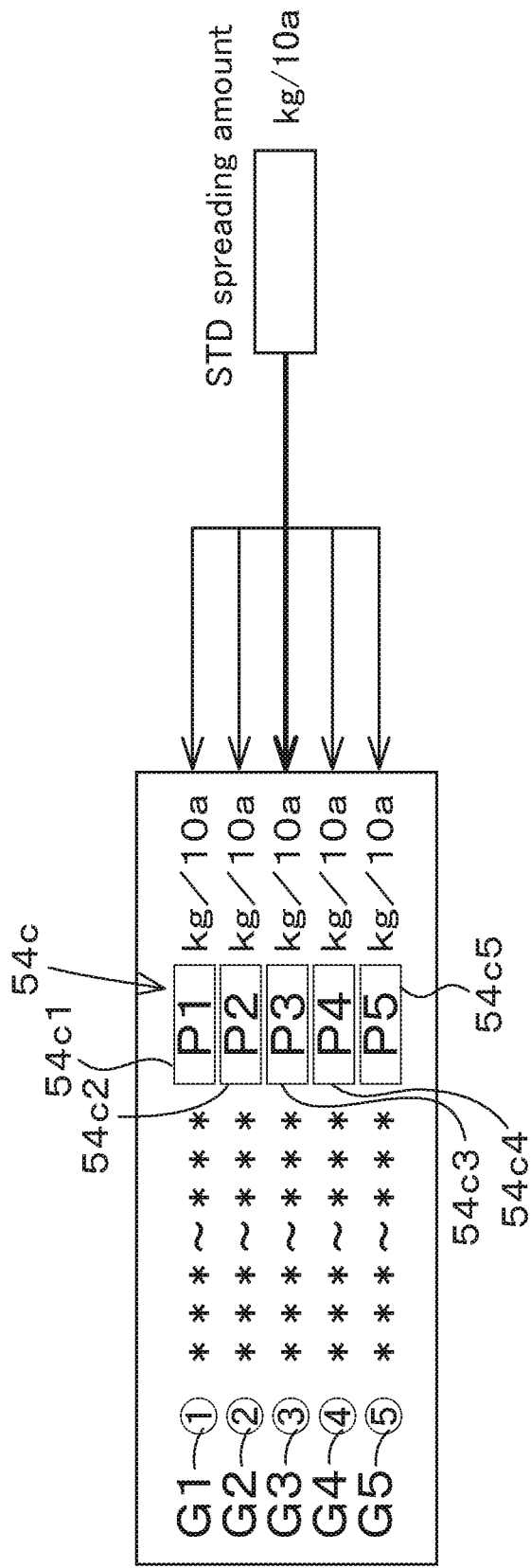
FIG. 15A is a view illustrating the setting of a case where a criterion spread amount is determined to a middle value of the set spreading amount according to the second embodiment.

When the auto determiner portion 11D obtains the criterion spreading amount from the server 1d, as shown in FIG. 15A, the auto determiner portion 11D determines that the third setting spreading amount P3 of the third input portion 54c3 located in the middle in the spreading input portion 54c employs the criterion spreading amount obtained from the server 1d.

The auto determiner portion 11D determines that the second set spreading amount P2 employs a value obtained by adding a predetermined amount to the third set spreading amount (the criterion spreading amount) P3. The auto determiner portion 11D determines that the first set spreading amount P1 employs a value obtained by adding a predetermined amount to the criterion spreading amount P3, the value being larger than the second set spreading amount P2.

In addition, the auto determiner portion 11D determines that the fourth set spreading amount P4 is a value obtained by subtracting a predetermined amount from the criterion spreading amount P3, and determines that the fifth set spreading amount P5 is a value obtained by subtracting the predetermined amount from the criterion spreading amount P3, the value being smaller than the fourth set spreading amount P4.

According to the auto determiner portion 11D described above, the criterion spreading amount registered in the server 1d is set to be the middle value of the set spreading amount (the third set spreading amount P3), and another set spreading amount is set by increasing or decreasing the middle value.

Figure 15B:
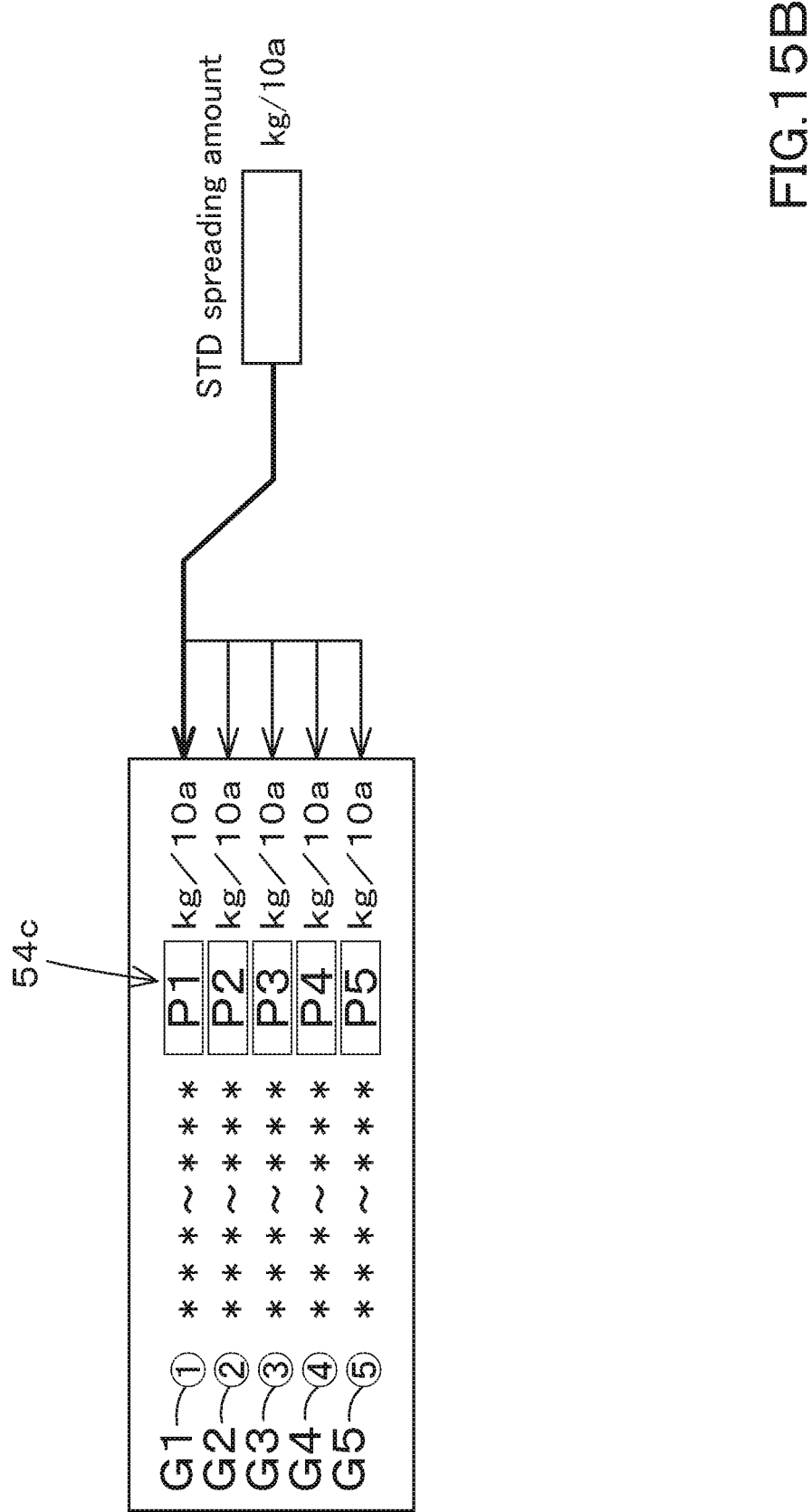
FIG. 15B is a view illustrating the setting of a case where the criterion spread amount is determined to the maximum value of the set spreading amount according to the second embodiment.

Although the auto determiner portion 11D described above sets the criterion spreading amount to be a middle value of the set spreading amount, the criterion spreading amount may be set to be the maximum value. In that case, when the auto determiner portion 11D obtains the criterion spreading amount from the server 1d, the auto determiner portion 11D determines, as illustrated in FIG. 15B, determines that the set spreading amount P1 of the first input portion 54c1 on the upper position employs the criterion spreading amount obtained from the server 1d.

The auto determiner portion 11D determines that the second set spreading amount P2 employs a value obtained by subtracting a predetermined amount from the first set spreading amount (the criterion spreading amount) P1, and determines that the third set spreading amount P3 employs a value obtained by subtracting the predetermined amount from the criterion spreading amount P1, the value being smaller than the second set spreading amount P2. In addition, the auto determiner portion 11D determines that's the fourth set spreading amount P4 employs a value obtained by subtracting a predetermined amount from the criterion spreading amount P1, the value being smaller than the third set spreading amount P3, and determines that the fifth set spreading amount P5 employs a value obtained by subtracting the predetermined amount from the criterion spreading amount P1, the value being smaller than the fourth set spreading amount P4.

According to the auto determiner portion 11D described above, the criterion spreading amount registered in the server 1d is set to be the maximum value of the set spreading amount (the first setting spreading amount P1), and another set spreading amount can be set by sequentially subtracting the predetermined value from the maximum value.

Figure 15C:
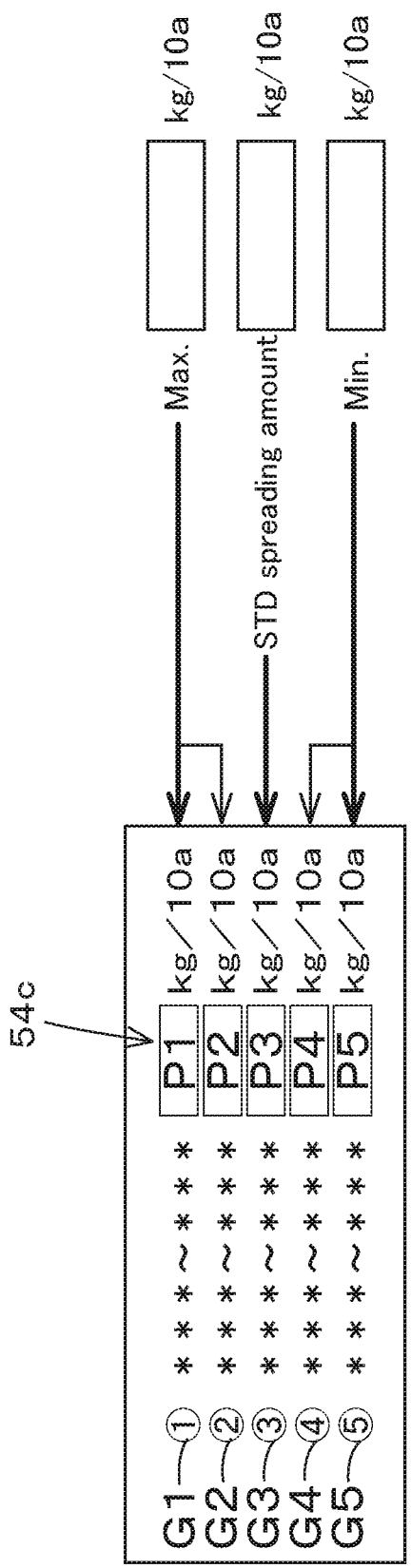
FIG. 15C is a view illustrating the way of setting the set spreading amount based on the criterion spread amount, the maximum spreading amount, and the minimum spreading amount according to the second embodiment.

The auto determiner portion 11D described above sets the set spreading amount only by increasing or decreasing the predetermined amount with respect to the criterion spreading amount. However, the set spreading amount may be set based on a combination between the criterion spreading amount, the maximum spreading amount, and the minimum spreading amount inputted to the area-unit inputting portion 301. In that case, when the auto determiner portion 11D obtains the criterion spreading amount from the server 1d, the auto determiner portion 11D determines that the third set spreading amount P3 employs the criterion spreading amount as shown in FIG. 15C. In addition, the auto determiner portion 11D sets the first set spreading amount P1 to be the maximum spreading amount inputted to the area-unit inputting portion 301, and sets the fifth set spreading amount P5 to be the minimum spreading amount inputted to the area-unit inputting portion 301. The auto determiner portion 11D determines that the second set spreading amount P2 employs a value obtained by subtracting a predetermined amount from the maximum spreading amount, and determines that the fourth set spreading amount P4 employs a value obtained by adding the predetermined amount to the minimum spreading amount.

According to the auto determiner portion 11D described above, the criterion spreading amount registered in the server 1d is set to be the middle value in the set spreading amount, while the value inputted by the operator or the like to the area-unit inputting portion 301 is set to be the maximum value and the minimum value of the set spreading amount.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. An agriculture support device which communicates with a managing computer having a monitor, the agriculture support device comprising:
    a controller; and
    a storage connected to the controller, wherein
    the controller is configured or programmed to:
        store in the storage, a plurality of types of crop data which relates to planting of crops in a plurality of divided areas locating a whole of an agricultural field, and a plurality of position data of each of the plurality of divided areas, each of the plurality of types of crop data being assigned to the respective one of the position data of each of the plurality of divided areas, each of the plurality of divided areas having a predetermined mesh size,
        categorize each of the plurality of divided areas into a plurality of ranked groups defined by a plurality of reference values for each of the plurality of types of crop data, wherein the plurality of divided areas categorized in the plurality of ranked groups locates the whole of the agricultural field,
        display correlation among the plurality of types of crop data in each of the plurality of divided areas, on the monitor of the managing computer,
        calculate a plurality of sub-total sums of products of the predetermined size and the number of the plurality of divided areas categorized in each of the plurality of ranked groups as a plurality of ranked group sub-total areas,
        display an agricultural field-unit input blank for an operator of the managing computer to input a field-unit spreading amount of spread substance available to be spread in the whole of the agricultural field, on the monitor of the managing computer,
        calculate a plurality of group-unit spreading amounts of the spread substance each for the plurality of ranked group sub-total areas such that a sum of the plurality of group-unit spreading amounts of the spread substance equals to the field-unit spreading amount input by the managing computer, and
        display the plurality of group-unit spreading amounts each for the plurality of ranked group sub-total areas, on the monitor of the managing computer.

2. The agriculture support device according to claim 1, wherein
    the plurality of types of crop data are two or more selected from a group croup consisting of yield data indicating a cropped yield, components data indicating moisture content and/or protein content of crops, growth data indicating growth status of the crops, and soil data indicating the chemical compositions of soils for each of the plurality of divided areas.

3. The agriculture support device according to claim 1, wherein
    the controller is configured or programmed to display the plurality of the reference values for each of the plurality of types of crop data, on the monitor of the managing computer, and to allow the operator to set the plurality of the reference values for each of the plurality of types of crop data.

4. An agriculture support system comprising:
    the agriculture support device according to claim 1; and
    a managing computer having a monitor, which communicates with the agriculture support device.

5. An agriculture support device which communicates with a managing computer having a monitor, the agriculture support device comprising:
    a controller; and
    a storage connected to the controller, wherein
    the controller is configured or programmed to:
        store in the storage, a plurality of types of crop data which relates to planting of crops in a plurality of divided areas locating a whole of an agricultural field, and a plurality of position data of each of the plurality of divided areas, each of the plurality of types of crop data being assigned to the respective one of the position data of each of the plurality of divided areas, each of the plurality of divided areas having a predetermined mesh size, categorize each of the plurality of divided areas into a plurality of ranked groups defined by a plurality of reference values for each of the plurality of types of crop data, wherein the plurality of divided areas categorized in the plurality of ranked groups locates the whole of the agricultural field, display correlation among the plurality of types of crop data in each of the plurality of divided areas, on the monitor of the managing computer, calculate a plurality of sub-total sums of products of the predetermined size and the number of the plurality of divided areas categorized in each of the plurality of ranked groups as a plurality of ranked group sub-total areas, display an area-unit input blank for an operator of the managing computer to input maximum and minimum amounts of spread substance available to be spread for the plurality of divided areas, on the monitor of the managing computer, calculate a plurality of group-unit spreading amounts of the spread substance each for the plurality of ranked group sub-total areas in accordance with the maximum amount and the minimum amount of spread substance input by the managing computer, and display the plurality of group-unit spreading amounts each for the plurality of ranked group sub-total areas, on the monitor of the managing computer.

6. The agriculture support device according to claim 5, wherein the plurality of types of crop data are two or more selected from a group consisting of yield data indicating a cropped yield, components data indicating moisture content and/or protein content of crops, growth data indicating growth status of the crops, and soil data indicating the chemical compositions of soils for each of the plurality of divided areas.

7. The agriculture support device according to claim 5, wherein the controller is configured or programed to display the plurality of the reference values for each of the plurality of types of crop data, on the monitor of the managing computer, and to allow the operator to set the plurality of the reference values for each of the plurality of types of crop data.

8. An agriculture support system comprising:

the agriculture support device according to claim 5; and a managing computer having a monitor, which communicates with the agriculture support device.

9. The agriculture support device according to claim 1, wherein the plurality of divided areas locates the whole of a single agricultural field, and the plurality of divided areas categorized into the plurality of ranked groups locates the whole of the single agricultural field.

10. The agriculture support device according to claim 5, wherein the plurality of divided areas locates the whole of a single agricultural field, and the plurality of divided areas categorized into the plurality of ranked groups locates the whole of the single agricultural field.

* * * * *